US012164935B2

(12) United States Patent
Fu

(10) Patent No.: US 12,164,935 B2
(45) Date of Patent: Dec. 10, 2024

(54) MESSAGE DISPLAY METHOD AND TERMINAL DEVICE

(71) Applicant: Huawei Technologies Co., Ltd., Shenzhen (CN)

(72) Inventor: Peng Fu, Shenzhen (CN)

(73) Assignee: HUAWEI TECHNOLOIGES CO., LTD., Shenzhen (CN)

( * ) Notice: Subject to any disclaimer, the term of this patent is extended or adjusted under 35 U.S.C. 154(b) by 0 days.

(21) Appl. No.: 17/772,854

(22) PCT Filed: Oct. 15, 2020

(86) PCT No.: PCT/CN2020/121049
§ 371 (c)(1),
(2) Date: Apr. 28, 2022

(87) PCT Pub. No.: WO2021/082931
PCT Pub. Date: May 6, 2021

(65) Prior Publication Data
US 2022/0365795 A1 Nov. 17, 2022

(30) Foreign Application Priority Data
Oct. 31, 2019 (CN) .......................... 201911054865.5

(51) Int. Cl.
*G06F 9/451* (2018.01)
*G06F 3/0481* (2022.01)
(Continued)

(52) U.S. Cl.
CPC ............ *G06F 9/451* (2018.02); *G06F 3/0481* (2013.01); *G06F 3/0484* (2013.01);
(Continued)

(58) Field of Classification Search
CPC ........ G06F 9/45; G06F 3/0481; G06F 3/0484; G06F 3/0488
See application file for complete search history.

(56) References Cited

U.S. PATENT DOCUMENTS 8,271,334 B1 * 9/2012 Funk .................... H04N 21/258
725/34
9,191,486 B2 * 11/2015 Tseng ................ H04M 1/72436
(Continued)

FOREIGN PATENT DOCUMENTS

CN 102915176 A 2/2013
CN 103902253 A 7/2014
(Continued)

OTHER PUBLICATIONS

David Gish, et al., "Is it possible to change the display duration of a UILocalNotification?" Dec. 18, 2013, XP093113325, 2 pages.
(Continued)

*Primary Examiner* — William L Bashore
*Assistant Examiner* — Gregory A Distefano
(74) *Attorney, Agent, or Firm* — Conley Rose P.C.

(57) ABSTRACT

A message display method includes receiving, by a terminal device, a message from a second application (APP) when displaying an interface of a first APP, wherein the first APP and the second APP are different applications (APPs), displaying the message in a pop-up window display manner on the interface, accepting a first operation comprising sliding, double-taping, or touching and holding the pop-up window of the message, and displaying, in response to the first operation, content of the message in a split-screen display manner.

20 Claims, 22 Drawing Sheets

(51) Int. Cl.
*G06F 3/0484* (2022.01)
*G06F 3/0488* (2022.01)
*G06F 1/329* (2019.01)

(52) U.S. Cl.
CPC ............ *G06F 3/0488* (2013.01); *G06F 1/329* (2013.01); *G06F 2203/04803* (2013.01)

(56) References Cited

U.S. PATENT DOCUMENTS

| | | | |
|---|---|---|---|
| 9,591,117 B1* | 3/2017 | Toren | H04M 1/72436 |
| 2007/0087766 A1 | 4/2007 | Hardy et al. | |
| 2013/0120447 A1* | 5/2013 | Kim | G06T 11/60 |
| | | | 345/173 |
| 2014/0179377 A1* | 6/2014 | Song | H04M 1/72403 |
| | | | 455/566 |
| 2015/0067588 A1 | 3/2015 | Shim et al. | |
| 2015/0295863 A1 | 10/2015 | Ye et al. | |
| 2016/0048320 A1* | 2/2016 | Han | G06F 3/04883 |
| | | | 715/765 |
| 2017/0075517 A1* | 3/2017 | Na | G06F 3/04883 |
| 2018/0164963 A1* | 6/2018 | Ku | G06F 3/04842 |
| 2018/0324567 A1* | 11/2018 | Mao | H04M 1/725 |
| 2019/0324612 A1 | 10/2019 | Du et al. | |
| 2020/0042171 A1* | 2/2020 | Tao | G06F 9/451 |

FOREIGN PATENT DOCUMENTS

| | | |
|---|---|---|
| CN | 104113785 A | 10/2014 |
| CN | 105487796 A | 4/2016 |
| CN | 105677265 A | 6/2016 |
| CN | 106095220 A | 11/2016 |
| CN | 106209797 A | 12/2016 |
| CN | 107517319 A | 12/2017 |
| CN | 107707760 A | 2/2018 |
| CN | 107835322 A | 3/2018 |
| CN | 107908351 A | 4/2018 |
| CN | 108111675 A | 6/2018 |
| CN | 108415753 A | 8/2018 |
| CN | 108574772 A | 9/2018 |
| CN | 108668176 A | 10/2018 |
| CN | 109005283 A | 12/2018 |
| CN | 109218519 A | 1/2019 |
| CN | 109343710 A | 2/2019 |
| CN | 109460174 A | 3/2019 |
| CN | 109491567 A | 3/2019 |
| CN | 109814975 A | 5/2019 |
| CN | 110225154 A | 9/2019 |
| EP | 1748354 A1 | 1/2007 |
| WO | 2015176448 A1 | 11/2015 |
| WO | 2016131106 A1 | 8/2016 |
| WO | 2017088554 A1 | 6/2017 |
| WO | 2018137467 A1 | 8/2018 |

OTHER PUBLICATIONS

Glenn Walter, "How to Change How Long Windows 10 Displays Notifications," Mar. 16, 2016, XP093113320, 8 pages.

* cited by examiner

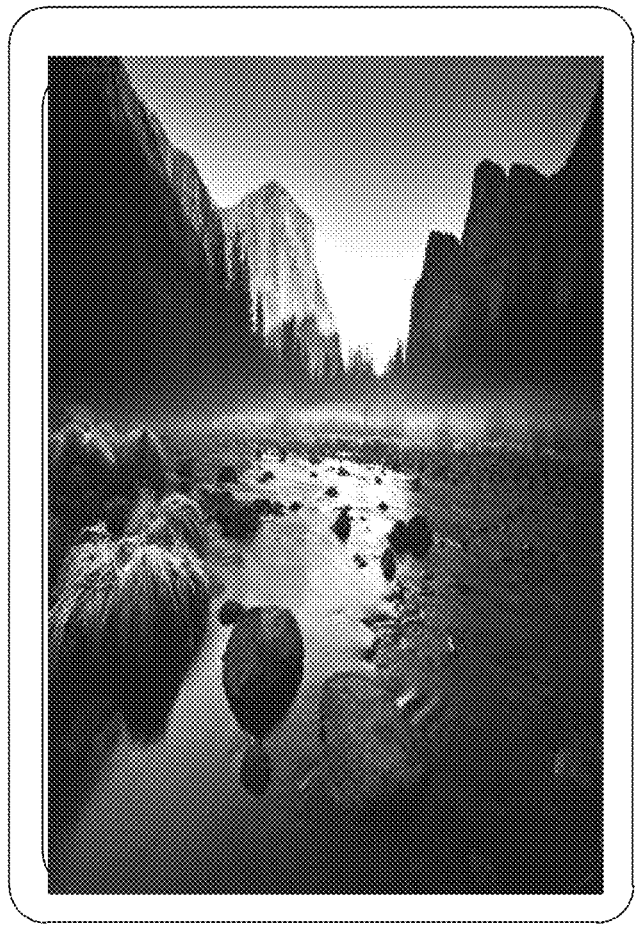
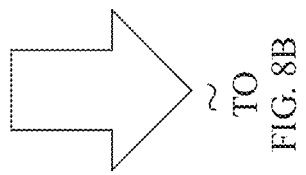
TO
FIG. 8B
FIG. 8A ately displays a running APP
MESSAGE DISPLAY METHOD AND TERMINAL DEVICE

CROSS-REFERENCE TO RELATED APPLICATIONS

This is a U.S. National Stage of International Patent Application No. PCT/CN2020/121049 filed on Oct. 15, 2020, which claims priority to Chinese Patent Application No. 201911054865.5 filed on Oct. 31, 2019. Both of the aforementioned applications are hereby incorporated by reference in their entireties.

TECHNICAL FIELD

Embodiments of this application relate to the field of terminal device technologies, and in particular, to a message display method and a terminal device.

BACKGROUND

With rapid development of electronic technologies, more applications (application, APP) are installed on a terminal device. Because a screen size of the terminal device is limited, the terminal device usually displays a running APP in a full-screen display manner. During full-screen display, an interface of only one APP is displayed on an entire screen of the terminal device.

To ensure that when an APP is displayed in full screen, a user can be reminded in time that the terminal device receives a message of another APP, a status bar is set at the top of the display of the terminal device. After receiving the message of the another APP, the terminal device may display a prompt box on the status bar of the terminal device, to prompt the user that the terminal device receives the message of the another APP, and display some or all content of the message in the prompt box. However, a quantity of words displayed in the prompt box is limited, and sometimes the user cannot obtain all content of a message based on the prompt box. If the user wants to further obtain all the content of the message, the terminal device needs to exit the APP that is displayed in full screen, and switch to a details page of the message for the user to view the message.

In the foregoing message display process, the terminal device needs to exit the APP that is currently displayed in full screen. If messages of another APP are frequently received in the full-screen display process, the terminal device needs to repeatedly switch between different APPs, and an operation process is complex.

SUMMARY

Embodiments of this application provide a message display method and a terminal device. When currently displaying a first APP in full screen, the terminal device obtains a to-be-displayed message, determines a display manner of the message, and displays the message based on the display manner, to avoid repeated switching of the terminal device between different APPs.

According to a first aspect, an embodiment of this application provides a message display method. The method is described from a perspective of a terminal device. The method includes: When the terminal device displays an interface of a first APP in full screen, if a message from a second APP is received, the terminal device determines a display manner of the message based on a mapping relationship table between a message of the second APP and a display manner, for example, a split-screen display manner, a pop-up window display manner, or a drop-down notification bar display manner, and then displays content of the message based on the display manner. According to this solution, regardless of the split-screen display manner, the pop-up window display manner, or the drop-down notification bar display manner, the terminal device does not need to exit the first APP that is currently displayed in full screen. Therefore, repeated switching of the terminal device between different APPs can be avoided, to reduce power consumption of the terminal device and an operation difficulty.

In a feasible design, the mapping relationship table includes a mapping relationship between an identifier of the second APP and a display manner. According to this solution, the mapping relationship between an identifier of the second APP and a display manner is stored by using an xml file, so that after receiving the message of the second APP, the terminal device can select the display manner of the message by querying the XML file, to avoid repeated switching of the terminal device between different APPs, so as to reduce the power consumption of the terminal device and the operation difficulty.

In a feasible design, the mapping relationship table includes a mapping relationship between a category label of the second APP and a display manner, and the category label of the second APP is used to indicate a category to which the second APP belongs.

According to this solution, the terminal device determines the display manner by querying the mapping relationship table based on the category label of the second APP, and further displays the message based on the display manner, to avoid repeated switching of the terminal device between different APPs, and reduce the power consumption of the terminal device.

In a feasible design, before selecting the display manner of the message based on the mapping relationship table between a message of the second APP and a display manner, the terminal device further controls the second APP to invoke a notification manager service NMS class at a framework FW layer of the terminal device, and obtain the identifier of the second APP by using the NMS class. According to this solution, the terminal device obtains the identifier of the second APP In a feasible design, the mapping relationship table includes a mapping relationship between a category label of the second APP and a display manner, and the category label of the second APP is used to indicate a category to which the second APP belongs. Optionally, the category label includes one or more of the following: a social category, an information category, an online shopping payment category, a daily consumption category, a query tool category, and a reading category. When the category label of the second APP is the social category, the display manner is the split-screen display manner. When the category label of the second APP is the information category or the online shopping payment category, the display manner is the pop-up window display manner. When the category label of the second APP is the daily consumption category, the query tool category, or the reading category, the display manner is the drop-down notification bar display manner. According to this solution, the terminal device determines the display manner by querying the mapping relationship table based on the category label of the second APP, and further displays the message based on the display manner, to avoid repeated switching of the terminal device between different APPs, and reduce the power consumption of the terminal device.

In a feasible design, before selecting the display manner of the message based on the mapping relationship table between a message of the second APP and a display manner, the terminal device further receives indication information sent by a server, where the indication information is used to indicate the category label of the second APP, and determines the mapping relationship table based on the category label of the second APP. According this solution, the terminal device periodically updates the category label of the second APP.

In a feasible design, the mapping relationship table includes a mapping relationship between a priority of the message and a display manner, the priority is added by the terminal device to a notification channel notification channel class corresponding to the message, and the priority is used to indicate importance of the message. The priority includes one or more of an emergency priority, a high priority, a default priority, a low priority, or a lowest priority. A display manner corresponding to the emergency priority and the high priority is the split-screen display manner. A display manner corresponding to the default priority is the pop-up window display manner. A display manner corresponding to the low priority and the lowest priority is the drop-down notification display manner. According to this solution, the priority of the message is set in the notification channel class corresponding to the message, and the terminal device determines the display manner by querying the mapping relationship table based on the priority, and further displays the content of the message based on the display manner, to avoid repeated switching of the terminal device between different APPs, and reduce the power consumption of the terminal device.

In a feasible design, the mapping relationship table includes a mapping relationship between a message type of the message and a display manner, and the message type is used to indicate whether the message includes an edit text. If the message includes the edit text, the display manner is the split-screen display manner, or if the message does not include the edit text, the display manner is the pop-up window display manner. According to this solution, the message type of the message is set in a notification class corresponding to the message, and the terminal device determines the display manner by querying the mapping relationship table based on the message type, and further displays the content of the message based on the display manner, to avoid repeated switching of the terminal device between different APPs, and reduce the power consumption of the terminal device.

In a feasible design, when the display manner is the pop-up window display, after displaying the content of the message based on the display manner, the terminal device displays the first APP and the message in split screens when a first operation instruction of operating, by a user, a pop-up window displayed in the pop-up window display manner is received, where the first operation instruction includes any one operation of sliding, double-tapping, or touching and holding the pop-up window. According to this solution, the terminal enters a pop-up window display mode from a full-screen display mode.

In a feasible design, when the display manner is the split-screen display manner, a button is displayed on a screen of the terminal device, and the terminal device displays the interface of the first APP in full screen when a second operation instruction of operating the displayed button by a user is received, where the second operation instruction includes any one operation of sliding, double-tapping, or touching and holding the button; or displays the interface of the first APP after waiting for preset duration According to this solution, the terminal device enters a full-screen display mode from a split-screen display mode.

In a feasible design, the message includes any one of the following messages: a message of a third-party APP, a system message of the terminal device, or a message of an APP of the terminal device.

According to a second aspect, an embodiment of this application provides a message display apparatus, including:
  a transceiver unit, configured to: when a terminal device displays an interface of a first application APP, receive a message from a second APP, where the first APP and the second APP are different APPs;
  a processing unit, configured to select a display manner of the message based on a mapping relationship table between a message of the second APP and a display manner, where the display manner is a split-screen display manner, a pop-up window display manner, or a drop-down notification bar display manner; and
  a display unit, configured to display content of the message based on the display manner.

In a feasible design, the mapping relationship table includes a mapping relationship between an identifier of the second APP and a display manner.

In a feasible design, before selecting the display manner of the message based on the mapping relationship table between a message of the second APP and a display manner, the processing unit is further configured to control the second APP to invoke a notification manager service NMS class at a framework FW layer of the terminal device, and obtain the identifier of the second APP by using the NMS class.

In a feasible design, the mapping relationship table includes a mapping relationship between a category label of the second APP and a display manner, and the category label of the second APP is used to indicate a category to which the second APP belongs.

In a feasible design, before the processing unit selects the display manner of the message based on the mapping relationship table between a message of the second APP and a display manner, the transceiver unit is further configured to receive indication information sent by a server, where the indication information is used to indicate the category label of the second APP; and the processing unit is further configured to determine the mapping relationship table based on the category label of the second APP.

In a feasible design, the mapping relationship table includes a mapping relationship between a priority of the message and a display manner, the priority is added by the terminal device to a notification channel notification channel class corresponding to the message, and the priority is used to indicate importance of the message.

In a feasible design, the priority includes one or more of an emergency priority, a high priority, a default priority, a low priority, or a lowest priority. A display manner corresponding to the emergency priority and the high priority is the split-screen display manner. A display manner corresponding to the default priority is the pop-up window display manner. A display manner corresponding to the low priority and the lowest priority is the drop-down notification display manner.

In a feasible design, the mapping relationship table includes a mapping relationship between a message type of the message and a display manner, and the message type is used to indicate whether the message includes an edit text. If the message includes the edit text, the display manner is the split-screen display manner, or if the message does not include the edit text, the display manner is the pop-up window display manner.

In a feasible design, when the display manner is the pop-up window display, after the display unit displays the content of the message based on the display manner, the transceiver unit is further configured to display the first APP and the message in split screens when receiving a first operation instruction of operating, by a user, a pop-up window displayed in the pop-up window display manner, where the first operation instruction includes any one operation of sliding, double-tapping, or touching and holding the pop-up window.

In a feasible design, when the display manner is the split-screen display manner, the display unit is further configured to: display a button on a screen of the terminal device, and display the interface of the first APP in full screen when the transceiver unit receives a second operation instruction of operating the displayed button by a user, where the second operation instruction includes any one operation of sliding, double-tapping, or touching and holding the button; or the display unit displays the interface of the first APP in full screen after waiting for preset duration.

In a feasible design, the message includes any one of the following messages: a message of a third-party APP, a system message of the terminal device, or a message of an APP of the terminal device.

According to a third aspect, an embodiment of this application provides a terminal device, including a processor, a memory, and a computer program that is stored in the memory and can be run on the processor. When executing the program, the processor performs the method according to the first aspect or the possible implementations of the first aspect.

According to a fourth aspect, an embodiment of this application provides a computer program product including instructions. When the computer program product runs on a terminal device, a computer of the terminal device is enabled to perform the method according to the first aspect or the possible implementations of the first aspect.

According to a fifth aspect, an embodiment of this application provides a computer-readable storage medium. The computer-readable storage medium stores instructions. When the instructions are run on a terminal device, the terminal device is enabled to perform the method according to the first aspect or the possible implementations of the first aspect.

According to a sixth aspect, an embodiment of this application provides a chip system. The chip system includes a processor, may further include a memory, and is configured to implement a function of the terminal device in the foregoing method. The chip system may include a chip, or may include a chip and another discrete component.

According to the message display method and the apparatus provided in embodiments of this application, when a terminal device displays an interface of a first APP in full screen, if a message from a second APP is received, the terminal device determines a display manner of the message based on a mapping relationship table between a message of the second APP and a display manner, for example, a split-screen display manner, a pop-up window display manner, or a drop-down notification bar display manner, and then displays content of the message based on the display manner. In this process, regardless of the split-screen display manner, the pop-up window display manner, or the drop-down notification bar display manner, the terminal device does not need to exit the first APP that is currently displayed in full screen. Therefore, repeated switching of the terminal device between different APPs can be avoided, to reduce power consumption of the terminal device and an operation difficulty.

BRIEF DESCRIPTION OF DRAWINGS

FIG. 8A to FIG. 8D is a schematic diagram of screen display in a message display method according to an embodiment of this application;

DESCRIPTION OF EMBODIMENTS

Figure 1:
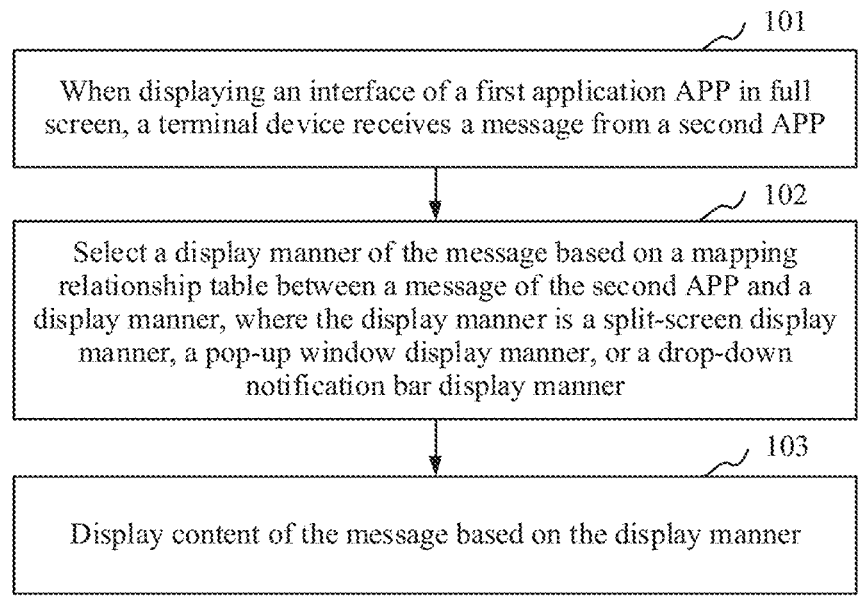
FIG. 1 is a flowchart of a message display method according to an embodiment of this application.

With rapid development of technologies, more large-screen devices appear, such as a tablet or a foldable screen. A user may use the large-screen device to watch a movie, browse images, read an e-book, browse news, and the like. When the large-screen device is in a full-screen display mode, only one APP is displayed on the screen. In the full-screen display mode, if a message, for example, an SMS message, a system reminder, or a message of a third-party APP, is received, the terminal device usually pops up a pop-up window, and displays brief information of the message in the pop-up window. If the user wants to view details of the message, the user needs to tap the pop-up window to switch to a details page of the message. If the message is a message of Messages or a chat tool, the user may further reply with an SMS message after viewing the message. Then, if the user wants to return to the original APP, the user needs to re-tap an icon of the original APP to return to the full-screen mode. It is clear that, in this process, consistent experience of using the initial APP is interrupted because the user views the details of the message. This seriously affects continuity of user experience. If the terminal device continuously receives other messages in a full-screen display process, the terminal device repeatedly switches between different APPs, resulting in high power consumption and a complex operation process.

In the foregoing message display process, the terminal device needs to repeatedly switch between different APPs. The power consumption is high, and the operation process is complex. In view of this, embodiments of this application provide a message display method and apparatus. When currently displaying a first APP in full screen, a terminal device obtains a to-be-displayed message, determines a display manner of the message, and displays the message based on the display manner, to avoid repeated switching of the terminal device between different APPs, so as to reduce power consumption of the terminal and an operation difficulty.

The terminal device in embodiments of this application may be a device having a screen and capable of providing a user with voice and/or data connectivity, a handheld device having a wireless connection function, or another processing device connected to a wireless modem In embodiments of this application, the terminal device may communicate with one or more core networks or the Internet by using a router through a radio access network (for example, a radio access network, RAN), and may be a mobile terminal device, for example, a mobile phone (or referred to as a "cellular" phone, a mobile phone (mobile phone)), a computer, a vehicle-mounted mobile apparatus, a personal digital assistant (personal digital assistant, PDA), a tablet computer (Pad), a computer having a wireless transceiver function, or another device. The terminal device may also be referred to as a system, a subscriber unit (subscriber unit), a subscriber station (subscriber station), a mobile station (mobile station, MS), a remote station (remote station), an access point (access point, AP), a remote terminal (remote terminal), an access terminal (access terminal), a user terminal (user terminal), a user agent (user agent), a subscriber station (subscriber station, SS), customer premises equipment (customer premises equipment, CPE), a terminal (terminal), user equipment (user equipment, UE), a mobile terminal (mobile terminal, MT), or the like. In addition, the terminal device may alternatively be a wearable device and a terminal device in a next-generation communications system, for example, a terminal device in a 5G network, a terminal device in a future evolved public land mobile network (public land mobile network, PLMN), a terminal device in an NR communications system, or the like.

In embodiments of this application, the terminal device currently displaying an interface of a first APP in full screen means that only the interface of the first APP is displayed on a screen of the terminal device. In the full-screen display process, after receiving a message of a second APP, the terminal device selects a display manner of the message, and displays specific content of the message based on the display manner. The second APP and the first APP are different APPs, and the second APP may be a system APP of the terminal device, a third-party APP installed on the second APP, an APP of the terminal device, or the like. The system APP refers to an APP installed on the terminal device before delivery, and cannot be uninstalled by the user, for example, Messages. The third-party APP is an APP downloaded and installed on the terminal device by the user, and the APP is provided by a third party. APPs of the terminal device are APPs in an APP store corresponding to a vendor of the terminal device, and the user may download or uninstall the APPs as required. These APPs are APPs developed by the vendor of the terminal device, and are not third-party APPs or system APPs.

FIG. 1 is a flowchart of a message display method according to an embodiment of this application. This embodiment describes in detail the message display method from a perspective of a terminal device. The method includes the following steps.

101: When displaying an interface of a first application APP in full screen, the terminal device receives a message from a second APP.

For example, in a process of using the terminal device to watch a video, browse images, read an e-book, view news, or the like, a user usually sets an interface of the terminal device to a full-screen display mode to ensure better viewing experience. In the full-screen display mode, the terminal device receives the message from the second APP. For example, the terminal device receives a message from a system APP. For another example, the terminal device receives a message sent by a server of a third-party APP. For another example, an APP of the terminal device receives a message sent by a corresponding server.

102: Select a display manner of the message based on a mapping relationship table between a message of the second APP and a display manner, where the display manner is a split-screen display manner, a pop-up window display manner, or a drop-down notification bar display manner.

For example, after receiving a message, the terminal device selects a display manner of the message by querying a mapping table or the like.

103: Display content of the message based on the display manner.

For example, if the display manner is the split-screen display manner, the terminal device automatically divides the screen into two regions, which are respectively referred to as a first region and a second region. Sizes of the first region and the second region may be flexibly set. For example, the first region occupies 50% of a total area of the screen, and the second region occupies the other 50%. For another example, the first region occupies 60% of a total area of the screen, and the second region occupies the other 40%. In addition, a location relationship between the first region and the second region may be flexibly set. For example, when the terminal device is currently in a portrait display state, the first region is located above the second region, or the second region is located below the first region. For another example, when the terminal device is in a landscape display state, the first region is located above the second region, or the second region is located above the first region. Alternatively, the first region is located on the left of the second region, or the second region is located on the left of the first region. The first region is used to display the interface of the first APP, and the second region is used to display the message. When the message is a message of a social APP, a keyboard and the like are further displayed in the second region, thereby facilitating a user reply.

If the display manner is the pop-up window display manner, when displaying the interface of the first APP in full screen, the terminal device pops up a pop-up window on the screen, and displays brief content of the message, an icon, and the like in the pop-up window. The icon is used to indicate a source of the message. For example, When the icon is an icon of a third-party APP, it indicates that the message is sent by a server of the third-party APP to the terminal device. A location, display duration, and the like of the pop-up window may be flexibly set. This is not limited in this embodiment of this application.

According to the message display method provided in this embodiment of this application, when the terminal device displays the interface of the first APP in full screen, if the message from the second APP is received, the terminal device determines the display manner of the message based on the mapping relationship table between a message of the second APP and a display manner, for example, the split-screen display manner, the pop-up window display manner, or the drop-down notification bar display manner, and then displays the content of the message based on the display manner. In this process, regardless of the split-screen display manner, the pop-up window display manner, or the drop-down notification bar display manner, the terminal device does not need to exit the first APP that is currently displayed in full screen. Therefore, repeated switching of the terminal device between different APPs can be avoided, to reduce power consumption of the terminal device and an operation difficulty.

Figure 2:
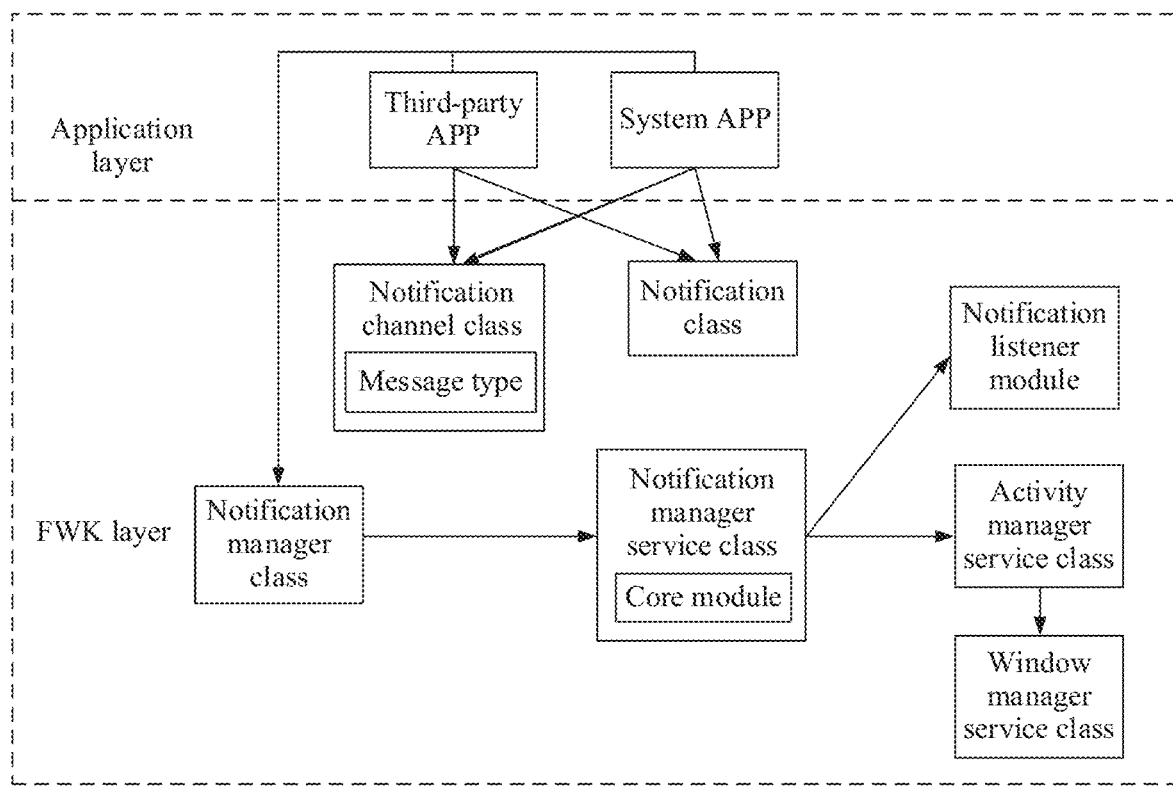
FIG. 2 is a schematic diagram of a framework of a terminal device according to an embodiment of this application.

FIG. 2 is a schematic diagram of a framework of the terminal device according to an embodiment of this application. Refer to FIG. 2. The framework includes an application layer and a framework (framework, FW) layer. The third-party APP, a system APP, and an APP that is of the terminal device are deployed at the application layer. When currently displaying the interface of the first APP in full screen, the terminal device receives the message from the second APP. The first APP is a third-party APP or a system APP deployed at the application layer, or an APP that is of the terminal device and that is deployed at the application layer. The second APP is any one of other APPs than the first APP at the application layer. In this case, the second APP initiates notification invoking, to initialize two core object classes, namely, a notification (notification) class and a notification channel (notification channel) class. In the initialization process, content, a title, and the like of the message are added to the notification class, and whether a vibration, a prompt tone, and the like are required is added to the notification channel class. At the FW layer, the application layer sends the message by invoking a notification manager (notification manager) class. In the invoking process, the notification manager class invokes a notification manager service (notification manager service, NMS) class, and a newly added module in the NMS class, which is referred to as a core module (core module) hereinafter, selects the display manner of the message. The core module listens to the message by using a notification listener (notification listeners) module, and invokes an activity manager service (activity manager service, AMS) class and a window manager service (Windows manager service, WMS) to display the message based on the display manner.

It can be learned from FIG. 2 that, in this embodiment of this application, the display manner of the message is determined by using the core module. The following describes in detail how the core module determines the display manner of the message.

In a feasible implementation, the mapping relationship table includes a mapping relationship between an identifier of the second APP and a display manner.

For example, a mapping relationship table is pre-stored in a memory of the terminal device, and the mapping relationship table stores the mapping relationship between an identifier of the second APP and a display manner. For example, the terminal device pre-stores the mapping relationship table in the memory, for example, a read-only memory (Read-Only Memory, ROM), in a manner of an xml file. The xml file may be stored in the ROM before delivery of the terminal device, and the xml file stores a mapping relationship between identifiers of system APPs such as Messages and Emails and display manners. When the message received by the terminal device is a message of the system APP, the system APP initiates notification invoking, and invokes the notification manager class, to further invoke the notification manager service class to obtain the identifier of the system APP. The core module in the NMS class queries the xml file based on the identifier of the APP to select a display manner of the message. If the display manner is the split-screen display manner, the core module continues to invoke the AMS class and the WMS class, to further divide the screen of the terminal device into the first region and the second region. The first region is used to display the interface of the first APP, so that the first APP is not interrupted. The second region is used to display the message, so that the user can easily view the detailed content of the message. In addition, in addition to being sent by a server of the second APP, the message may alternatively be a message sent by a local APP of the terminal device, for example, Notes.

According to the method provided in this embodiment, the mapping relationship between an identifier of the second APP and a display manner is stored by using the xml file, so that after receiving the message of the second APP, the terminal device can select the display manner of the message by querying the XML file, to avoid repeated switching of the terminal device between different APPs, so as to reduce the power consumption of the terminal device and the operation difficulty.

In another feasible design, the mapping relationship table includes a mapping relationship between a category label of the second APP and a display manner, and the category label of the second APP is used to indicate a category to which the second APP belongs.

For example, a local database of the terminal device stores the category label of the second APP, and the terminal device may periodically update the locally stored category label. In the update process, the terminal device receives indication information sent by the server, where the indication information is used to indicate the category label of the second APP, and then the terminal device determines the mapping relationship table based on the category label of the second APP. For example, the terminal device obtains the category label of the second APP in a manner such as sending a hypertext transfer protocol (hyper text transfer protocol, HTTP) request to a cloud server, and the cloud server adds the category label of the second APP to indication information and sends the indication information to the terminal device. The terminal device updates the category label of the second APP to the local database.

Optionally, the category label includes one or more of the following, a social category, an information category, an online shopping payment category, a daily consumption category, a query tool category, and a reading category. When the category label of the second APP is the social category, the display manner is the split-screen display manner. When the category label of the second APP is the information category or the online shopping payment category, the display manner is the pop-up window display manner. When the category label of the second APP is the daily consumption category, the query tool category, or the reading category, the display manner is the drop-down notification bar display manner. For example, when the second APP is WeChat, Sina Weibo, QQ, or Facebook (Facebook), the category label is the social category. When the second APP is NetEase, Douban, Zhihu, or Toutiao, the category label is the information category. When the second APP is Taobao, Tmall, Jingdong Mall, Meituan, Dangdang, or the like, the category label is the online shopping payment category. When the second APP is Qunar, Dianping, or the like, the category label is the daily consumption category. When the second APP is QuickPai, Train Schedules, or the like, the category label is the query tool category. When the second APP is an e-book or the like, the category label is the reading category.

For example, the second APP is a third-party APP. For a correspondence between a category label and a display manner, refer to Table 1.

TABLE 1

| Category label of the third-party APP | Display manner |
|---|---|
| Game category | Displayed in the drop-down notification bar, but not actively displayed |
| Online shopping payment category | Pop-up window display |
| Information category | Displayed in the drop-down notification bar, but not actively displayed |
| Query tool category | Displayed in the drop-down notification bar, but not actively displayed |
| Daily consumption category | Active pop-up notification display |
| Travel and accommodation category | Displayed in the drop-down notification bar, but not actively displayed |
| Photo and video category | Displayed in the drop-down notification bar, but not actively displayed |
| Reading category | Pop-up window display |
| Social category | Split-screen display |
| Finance and wealth management category | Pop-up window display |
| Education category | Displayed in the drop-down notification bar, but not actively displayed |
| Trip and navigation category | Active pop-up notification display |
| Food category | Displayed in the drop-down notification bar, but not actively displayed |
| Automobile category | Displayed in the drop-down notification bar, but not actively displayed |
| Category label of the third-party APP | Display manner |
| Business category | Pop-up window display |
| Children category | Displayed in the drop-down notification bar, but not actively displayed |
| Sports and health category | Displayed in the drop-down notification bar, but not actively displayed |
| Personalized theme category | Displayed in the drop-down notification bar, but not actively displayed |

Refer to Table 1. After the terminal device obtains the message of the second APP, the second APP initiates notification invoking, and invokes the notification manager class, to further invoke the notification manager service class. The core module in the notification manager service class queries the mapping relationship table between a category label and a display manner in the local database to select the display manner of the message. If the display manner is the split-screen display manner, the core module continues to invoke the AMS class and the WMS class, to further divide the screen of the terminal device into the first region and the second region. The first region is used to display the interface of the first APP, so that the first APP is not interrupted. The second region is used to display the message, so that the user can easily view the detailed content of the message. If the display manner is the pop-up window display manner, when displaying the interface of the first APP in full screen, the terminal device pops up a pop-up window on the screen, and displays the brief content of the message and the like in the pop-up window. If the display manner is the drop-down notification bar display manner, when displaying the interface of the first APP in full screen, the terminal device displays the message in the notification bar of the terminal device. The user can see the message only when the user pulls down the drop-down notification bar of the terminal device. Otherwise, the user cannot see the message. In other words, the user is unaware of the message received by the terminal device.

In the foregoing embodiment, the terminal device determines the display manner by querying the mapping relationship table based on the category label of the second APP, and further displays the message based on the display manner, to avoid repeated switching of the terminal device between different APPs, and reduce power consumption of the terminal device.

In another feasible implementation, the mapping relationship table includes a mapping relationship between a priority of the message and a display manner, the priority is added by the terminal device to the notification channel notification channel class corresponding to the message, and the priority is used to indicate importance of the message.

After the terminal device receives the message of the second APP, the second APP initiates notification invoking, to initialize two core object classes, namely, the notification (notification) class and the notification channel (notification channel) class. In the initialization process, the priority of the message is added to the notification channel class. At the FW layer, the application layer sends the message by invoking the notification manager (notification manager) class. In the invoking process, the notification manager class invokes the notification manager service (notification manager service, NMS) class to obtain the priority from the notification channel class. Then, the core module in the NMS class queries the mapping table based on the priority to determine the display manner of the message.

According to the method provided in this embodiment, the priority of the message is set in the notification channel class corresponding to the message, and the terminal device determines the display manner by querying the mapping relationship table based on the priority, and further displays the content of the message based on the display manner, to avoid repeated switching of the terminal device between different APPs, and reduce the power consumption of the terminal device.

In the foregoing embodiment, the priority includes one or more of an emergency priority, a high priority, a default priority, a low priority, or a lowest priority. A display manner corresponding to the emergency priority and the high priority is the split-screen display manner. A display manner corresponding to the default priority is the pop-up window display manner. A display manner corresponding to the low priority and the lowest priority is the drop-down notification display manner.

For example, the terminal device locally pre-stores a mapping relationship table, and the mapping relationship table stores the mapping relationship between a priority and a display manner. For example, refer to Table 2. Table 2 is a mapping relationship table between a priority and a display manner.

TABLE 2

| Priority | Flag meaning | Display manner |
|---|---|---|
| MAX (emergency priority) | An important and urgent notification that notifies the user of an event that is time-critical or requires immediate handling | Split-screen display manner |
| HIGH (high priority) | The high priority is used for important communication content, such as an SMS message or a chat, which is of interest to the user | Split-screen display manner |

TABLE 2-continued

| Priority | Flag meaning | Display manner |
| --- | --- | --- |
| DEFAULT (default priority) | The default priority is used for a notification that does not have a special priority classification | Pop-up window display manner |
| LOW (low priority) | The low priority may be used to notify the user of an event that is not very urgent | Drop-down notification bar display manner |
| MIN (lowest priority) | Used for background messages (such as weather or location information), where only an icon is displayed for a lowest-priority notification in a status bar, and only by pulling down a notification drawer, can the user see content | Drop-down notification bar display manner |

After the terminal device receives the message of the second APP, the second APP initiates notification invoking, to initialize the notification class and the notification channel class. In the initialization process, the priority of the message is added to the notification channel class. At the FW layer, the application layer sends the message by invoking the notification manager class. In the invoking process, the notification manager class invokes the NMS class to obtain the priority from the notification channel class. Then, the core module in the NMS class queries the Table 2 based on the priority to determine the display manner of the message.

According to the method provided in this embodiment, the priority of the message is set in the notification channel class corresponding to the message, and the terminal device determines the display manner by querying the mapping relationship table based on the priority, and further displays the content of the message based on the display manner, to avoid repeated switching of the terminal device between different APPs, and reduce the power consumption of the terminal device.

In another feasible implementation, the mapping relationship table includes a mapping relationship between a message type of the message and a display manner, and the message type is used to indicate whether the message includes an edit text. If the message includes the edit text, the display manner is the split-screen display manner, or if the message does not include the edit text, the display manner is the pop-up window display manner.

Figure 3:
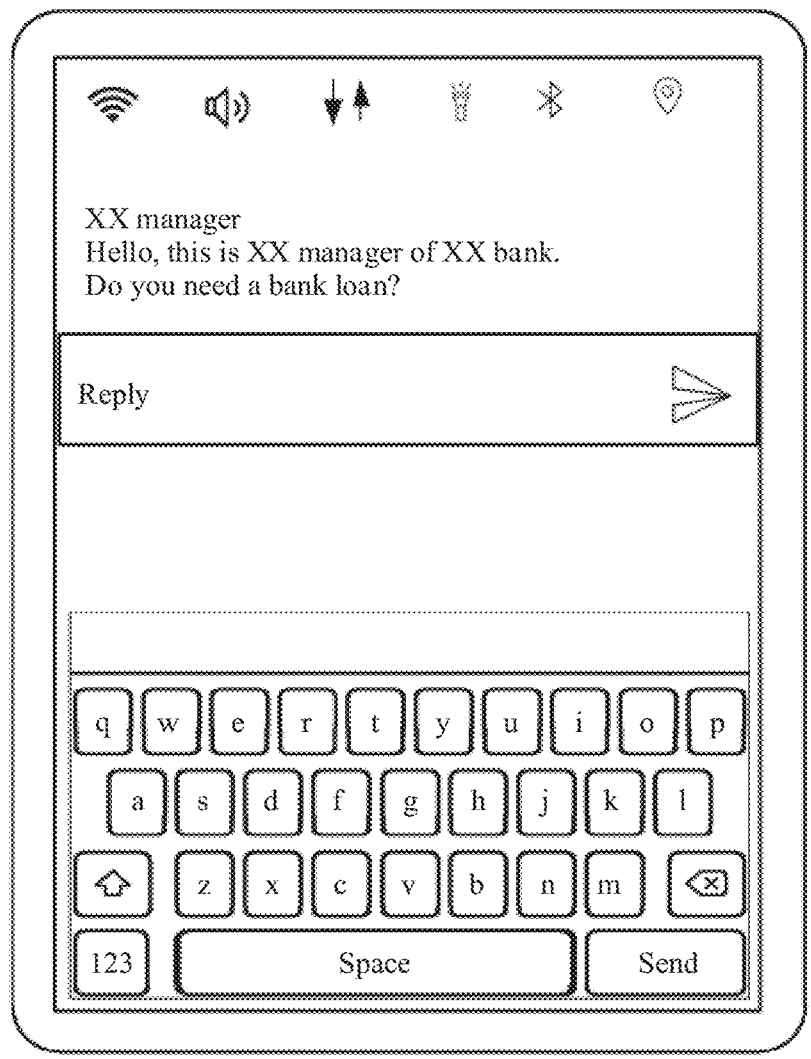
FIG. 3 is a schematic diagram of an edit text control in a message display method according to an embodiment of this application.

After the terminal device receives the message of the second APP, the second APP initiates notification invoking, to initialize two core object classes, namely, the notification (notification) class and the notification channel (notification channel) class. In the initialization process, the message type of the message is added to the notification class. The message type is used to indicate whether the message includes an edit text (edit text) control. For example, refer to FIG. 3. FIG. 3 is a schematic diagram of the edittext control in the message display method according to an embodiment of this application. Refer to FIG. 3. If the message includes a window used for a user reply, as shown by a solid line box that includes the word "reply" in the figure, the message is a message that includes the edittext. Otherwise, it is considered that the message is a message that does not include the edittext.

At the FW layer, the application layer sends the message by invoking the notification manager (notification manager) class. In the invoking process, the notification manager class invokes the notification manager service (notification manager service, NMS) class, and the NMS class parses the notification class. If the notification class includes the edit text control, the split-screen display manner is selected. If the notification class does not include the edit text control, the pop-up window display manner is selected.

In this embodiment, the mapping relationship table stores the mapping relationship between a message type and a display manner. For example, refer to Table 3. Table 3 is a mapping relationship table between a message type and a display manner.

TABLE 3

| Message type | Display manner |
| --- | --- |
| Including the edit text (edittext) | Split-screen display manner |
| Not including the edittext | Pop-up window display manner |

According to the method provided in this embodiment, the message type of the message is set in the notification class corresponding to the message, and the terminal device determines the display manner by querying the mapping relationship table based on the message type, and further displays the content of the message based on the display manner, to avoid repeated switching of the terminal device between different APPs, and reduce the power consumption of the terminal device.

In another feasible implementation, the mapping relationship table includes a mapping relationship between a display type of the message and a display manner, and the display type is used to indicate a display type field added to the notification channel when the second APP creates the notification channel notification channel for the message. Different display types correspond to different display manners.

After the terminal device receives the message of the second APP, the second APP initiates notification invoking, to initialize two core object classes, namely, the notification (notification) class and the notification channel (notification channel) class. In the initialization process, the display type of the message is added to the notification channel class. At the FW layer, the application layer sends the message by invoking the notification manager (notification manager) class. In the invoking process, the notification manager class invokes the notification manager service (notification manager service, NMS) class to obtain the display type from the notification channel class. Then, the core module in the NMS class queries the mapping table based on the display type to determine the display manner of the message.

In this embodiment, the mapping relationship table stores the mapping relationship between a display type and a display manner. For example, refer to Table 4. Table 4 is a mapping relationship table between a display type and a display manner.

TABLE 4

| Full screent type definition | Display manner |
| --- | --- |
| FULL_SCREEN_SPLIT | Split-screen display |
| FULL_SCREEN_HIDE | Displayed in the drop-down notification bar, but not actively displayed |
| FULL_SCREEN_SHOW | Pop-up window display |

After receiving the message of the second APP such as the system APP or the third-party APP, the terminal device constructs the notification class and the notification channel class, and adds the display type to the notification channel class. The display type includes a split-screen display type (FULL_SCREEN_SPLIT), a hidden type (FULL_SCREEN_HIDE), and a pop-up window display type (FULL_SCREEN_SHOW). Then, the second APP initiates notification invoking, and invokes the notification manager class, to further invoke the notification manager service class. The core module obtains the display type from the notification channel class, and queries the mapping relationship table based on the display type to determine the display manner of the message.

According to the method provided in this embodiment, the display type of the message is set in the notification class corresponding to the message, and the terminal device determines the display manner by querying the mapping relationship table based on the display type, and further displays the content of the message based on the display manner, to avoid repeated switching of the terminal device between different APPs, and reduce the power consumption of the terminal device.

Figure 4A:
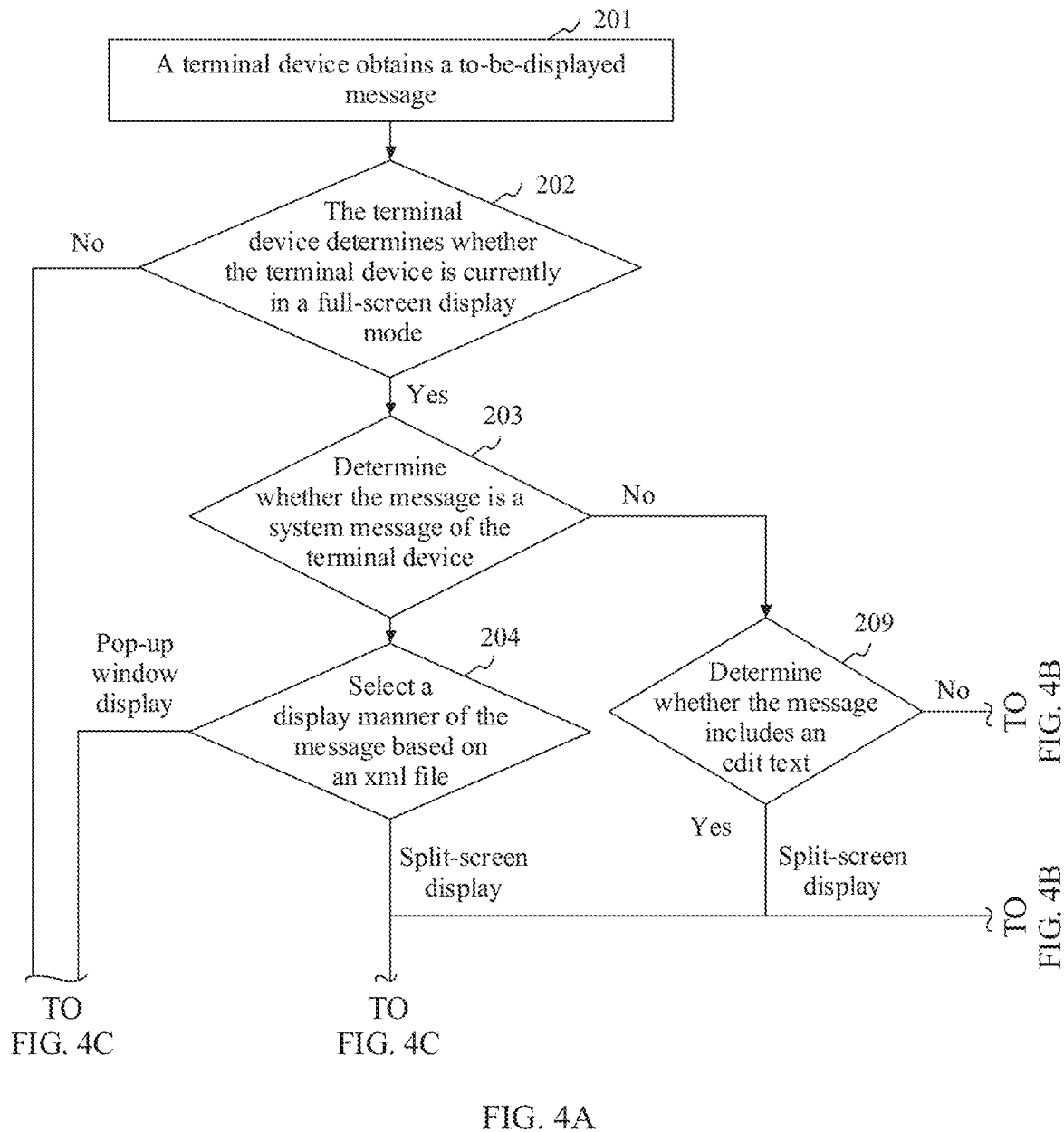
FIG. 4A to FIG. 4C is a flowchart of another message display method according to an embodiment of this application.
Figure 4B:
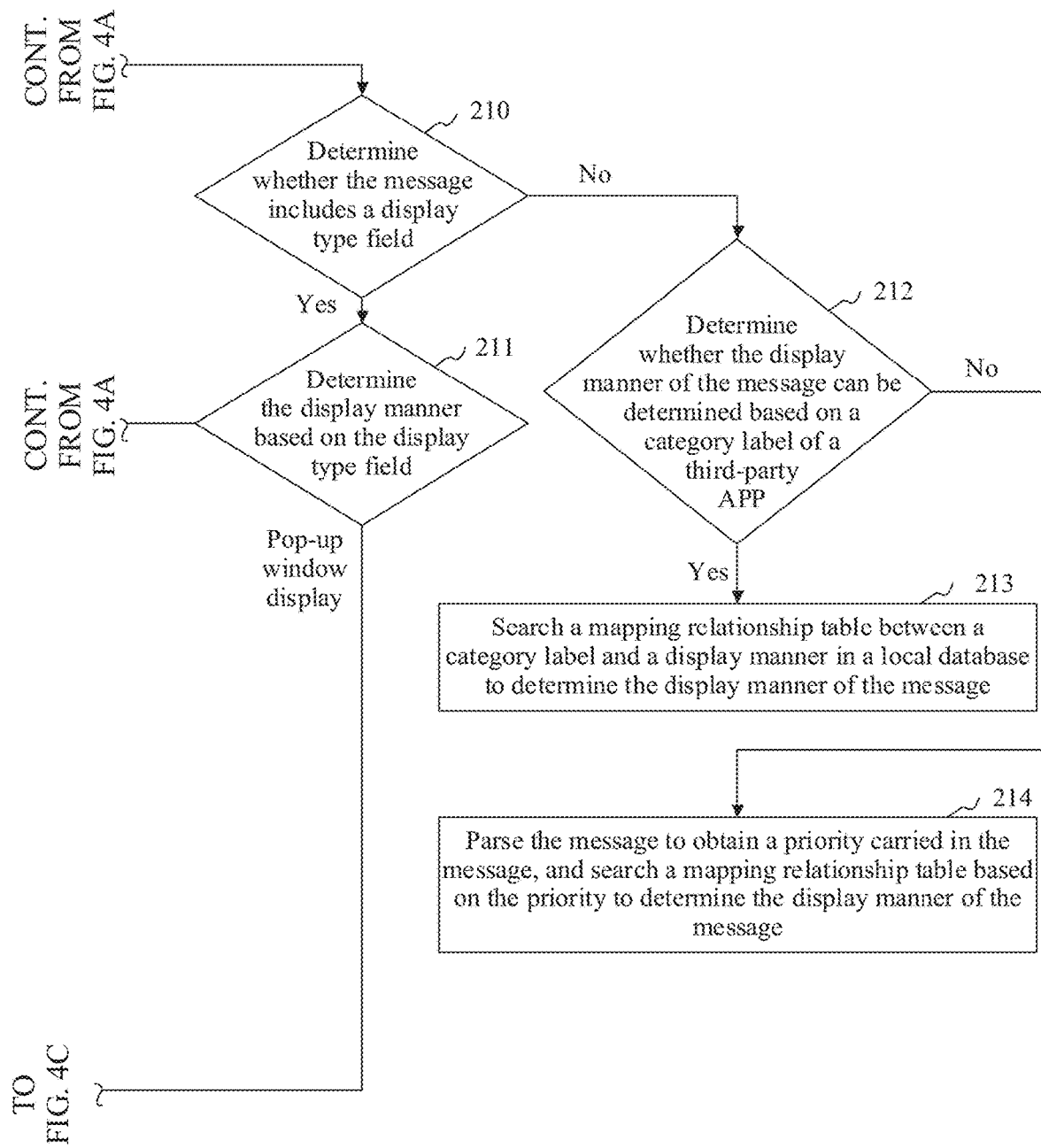
Figure 4C:
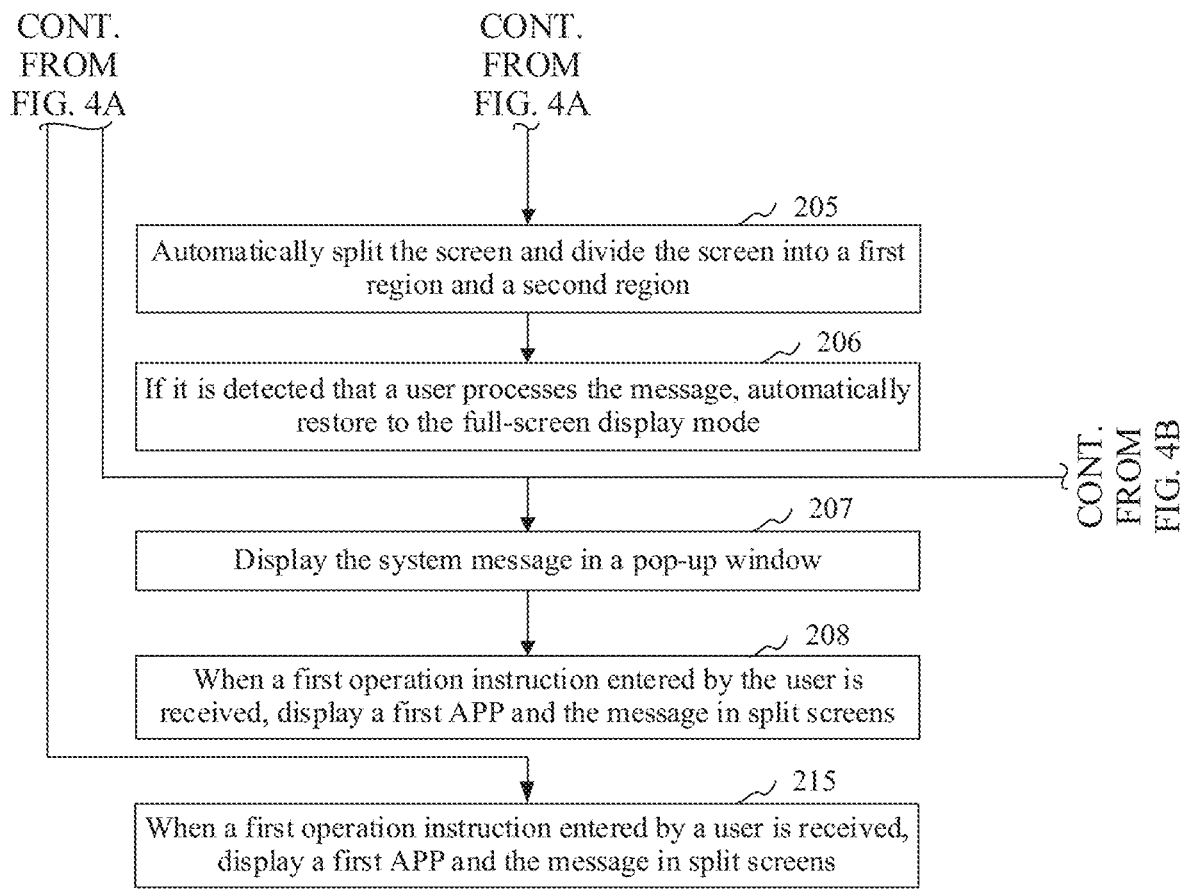

FIG. 4A to FIG. 4C is a flowchart of another message display method according to an embodiment of this application. Refer to FIG. 4A to FIG. 4C. This embodiment includes the following steps:

201: A terminal device obtains a to-be-displayed message.

For example, the to-be-displayed message may be a message of a system APP, a message of a third-party APP, or a message of an APP of the terminal device.

202: The terminal device determines whether the terminal device is currently in a full-screen display mode, where if the terminal device is currently in the full-screen display mode, step 203 is performed, or if the terminal device is not currently in the full-screen display mode, step 215 is performed.

For example, the terminal device determines whether a windows (Windows) attribute includes a full-screen flag (FLAG_FULLSCREEN) field, to determine whether a video is watched, news is viewed, an e-book is read, or the like on the terminal device in the full-screen mode currently. If the Windows attribute includes the FLAG_FULLSCREEN field, it indicates that the terminal device is currently in the full-screen display mode, and step 203 is performed. If the Windows attribute does not include the FLAG_FULLSCREEN field, it indicates that the terminal device is not currently in the full-screen display mode, and step 215 is performed.

203: Determine whether the message is a system message of the terminal device, where if the message is a system message of the terminal device, step 204 is performed, or if the message is not a system message of the terminal device, step 206 is performed.

204: Select a display manner of the message based on an xml file, where if the display manner is a split-screen display manner, step 205 is performed, or if the display manner is a pop-up window display manner, step 207 is performed.

205: Automatically split the screen and divide the screen into a first region and a second region.

The first region is used to display an interface of a first APP, and the second region is used to display a system message.

In the foregoing steps 204 and 205, if the message is a message of the system APP of the terminal device, for example, Messages, Emails, or local Notes, the terminal device selects the display manner of the message based on the pre-stored xml file. If the display manner is the split-screen display manner, the terminal device divides the screen into the first region and the second region. The first region is used to display the interface of the first APP, so that the first APP is not interrupted. The second region is used to display the message, so that a user can easily view detailed content of the message.

206: If it is detected that the user processes the message, automatically restore to the full-screen display mode.

Figure 5A:
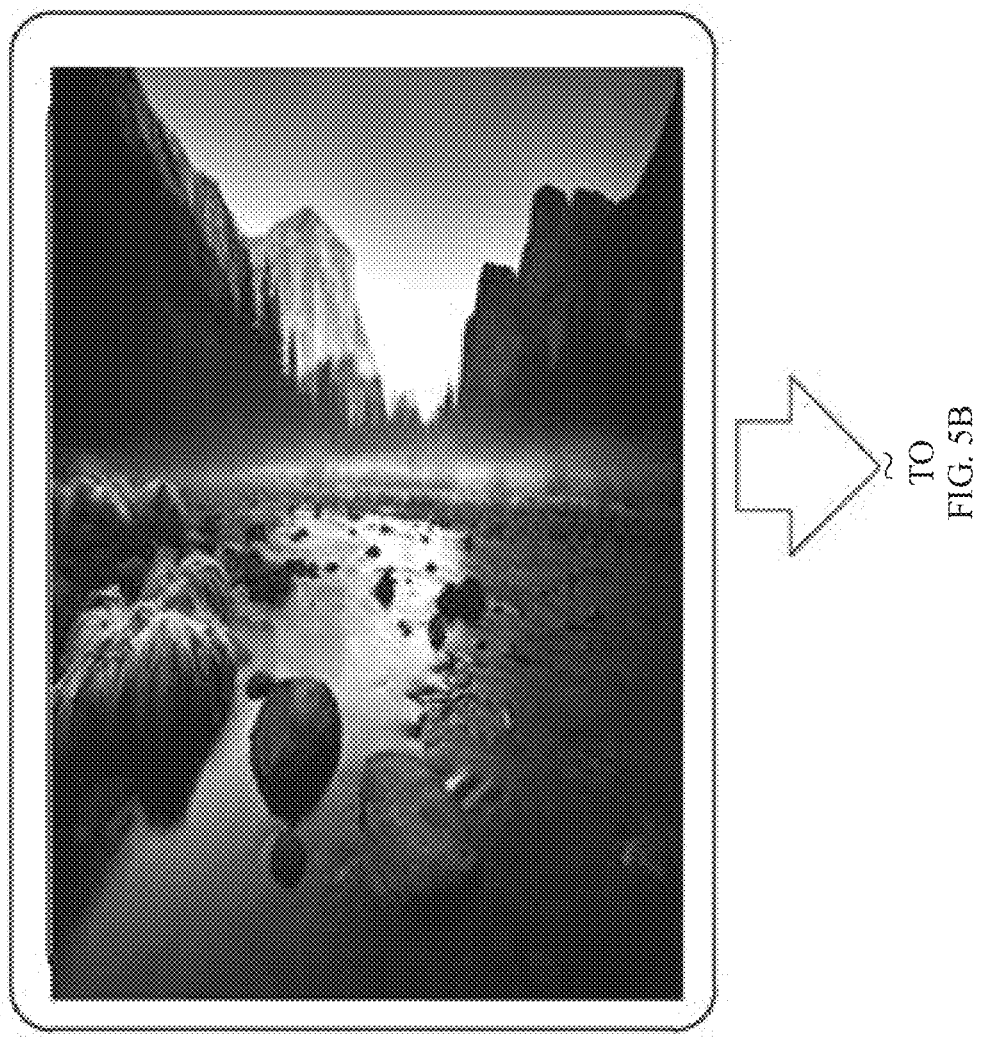
FIG. 5A to FIG. 5C is a schematic diagram of screen display in a message display method according to an embodiment of this application.
Figure 5B:
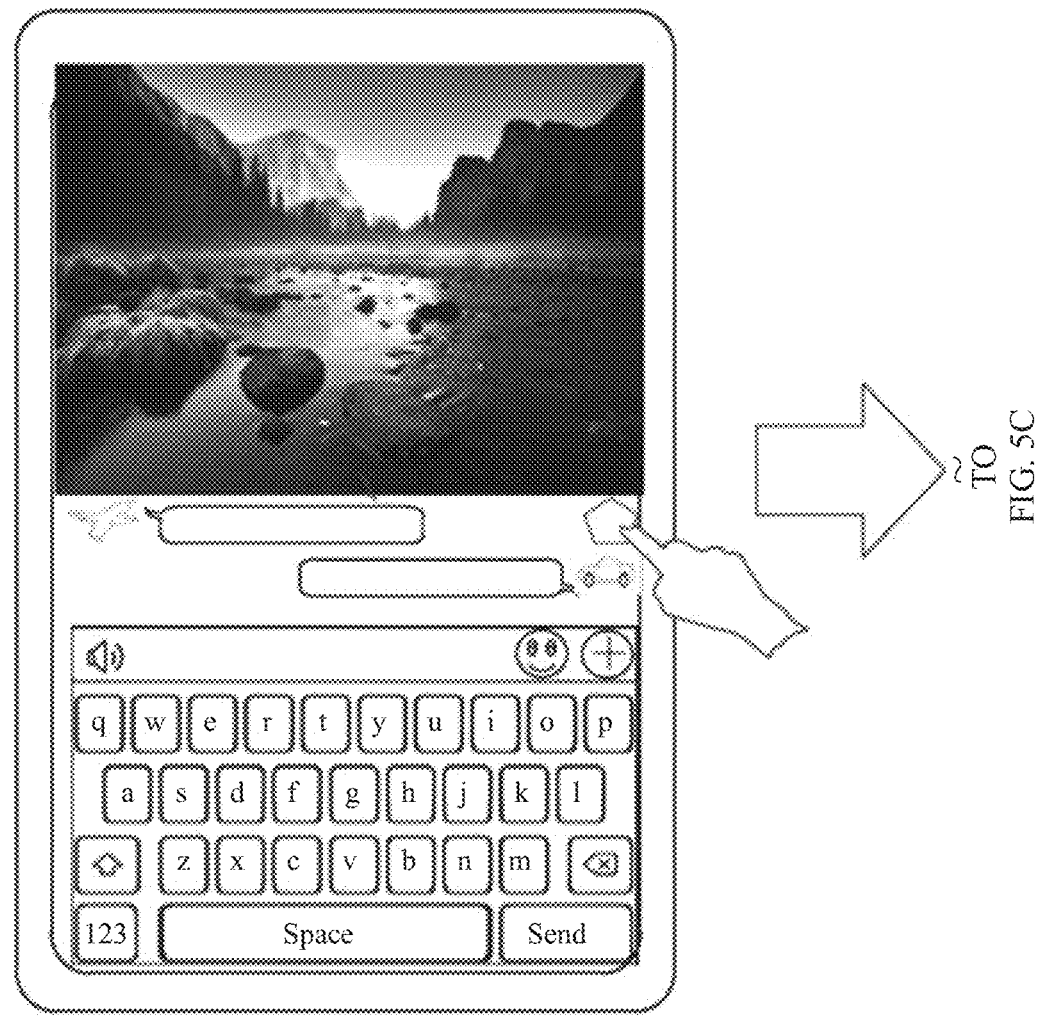
Figure 5C:
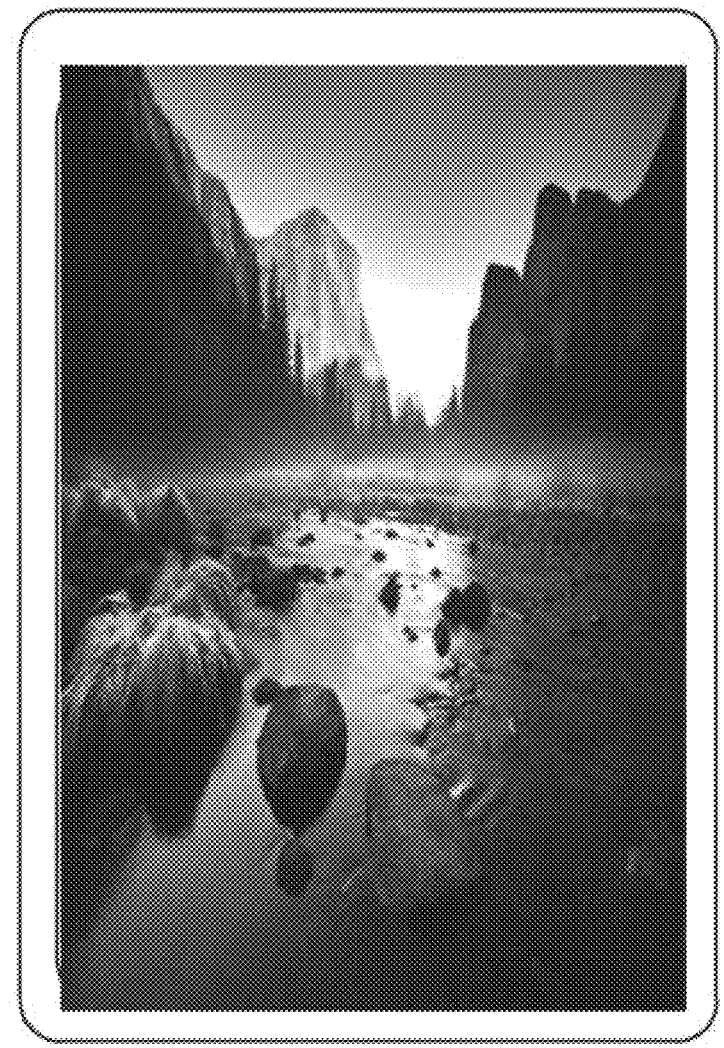

For example, refer to FIG. 5A to FIG. 5C and FIG. 6A to FIG. 6C. FIG. 5A to FIG. 5C is a schematic diagram of screen display in the message display method according to an embodiment of this application.

Refer to FIG. 5A to FIG. 5C. Initially, the user browses images in full screen. After the terminal device receives a message that needs to be replied, the screen is automatically divided into two regions, which are respectively used to display the interface of the first APP and the message. In addition, a button is further displayed on the screen, as shown by a regular pentagon in the figure. After the user replies to the message, the user enters a second operation instruction, where the second operation instruction is sliding, double-taping, or touching and holding the regular pentagonal button. After identifying the second operation instruction, the terminal device automatically restores to the full-screen display mode. Alternatively, the button may not be displayed on the screen, and the terminal device automatically restores to the full-screen display mode after detecting that the user replies to the message. Alternatively, the button may not be displayed on the screen, and the terminal device automatically restores to the full-screen display mode after detecting that split-screen display duration exceeds a specific threshold.

Figure 6A:
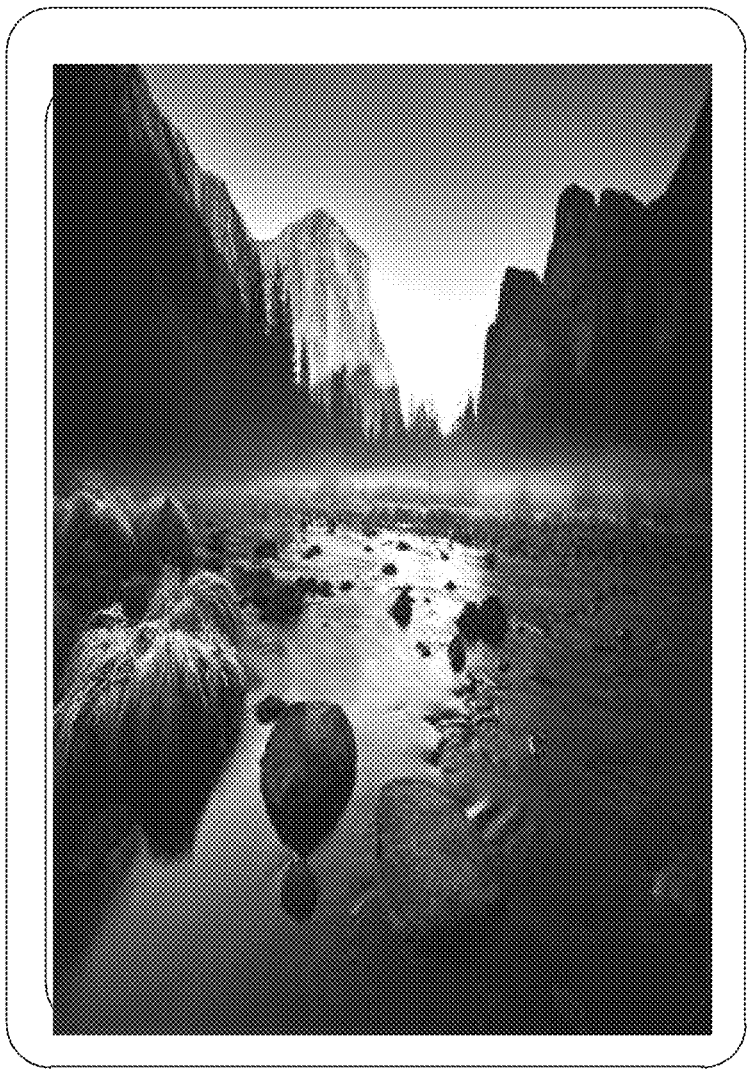
FIG. 6A to FIG. 6C is a schematic diagram of screen display in a message display method according to an embodiment of this application.
Figure 6A:
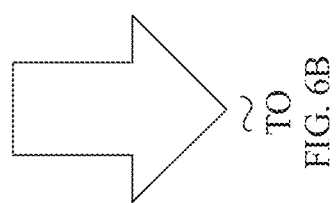
Figure 6B:
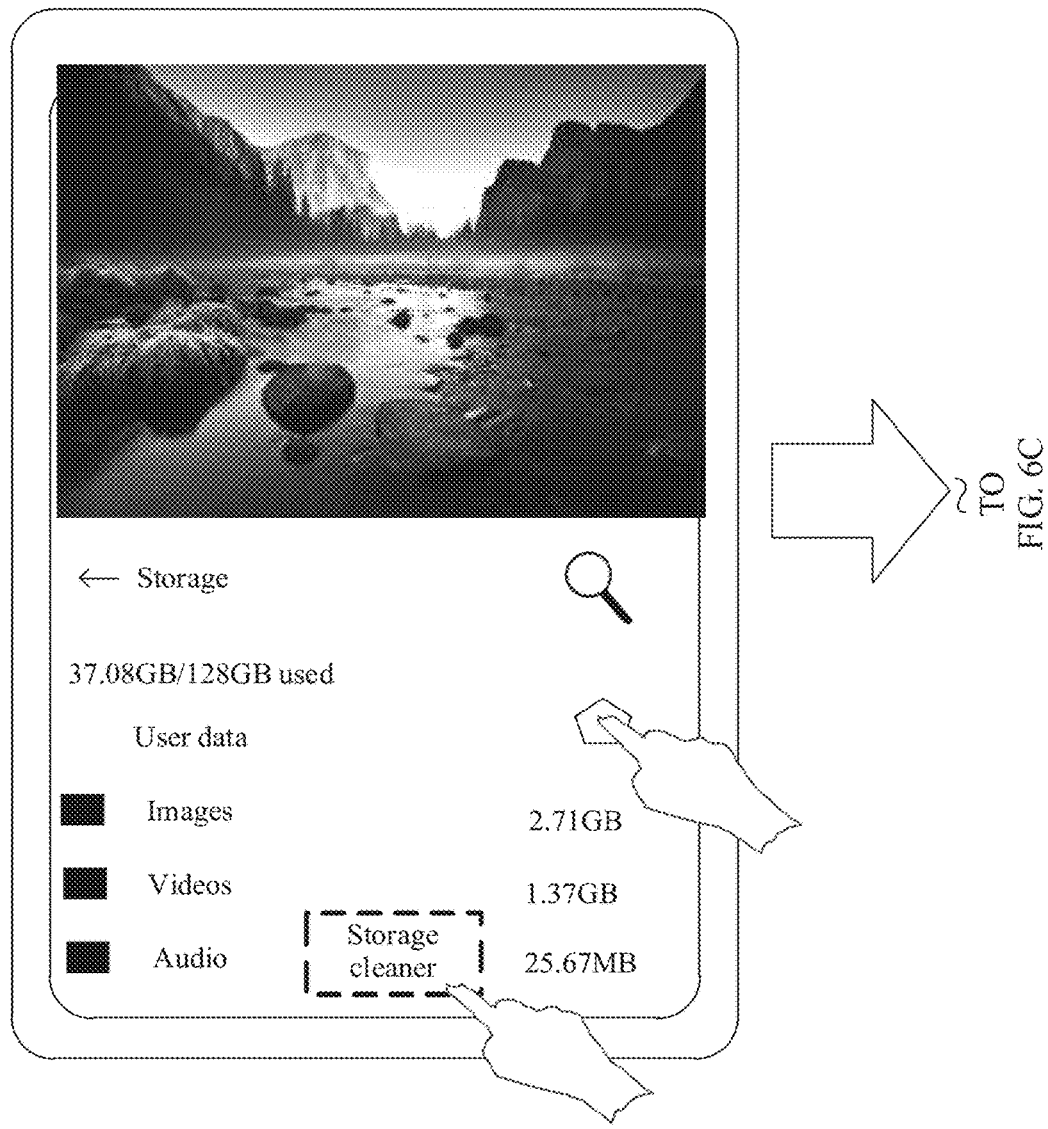
Figure 6C:
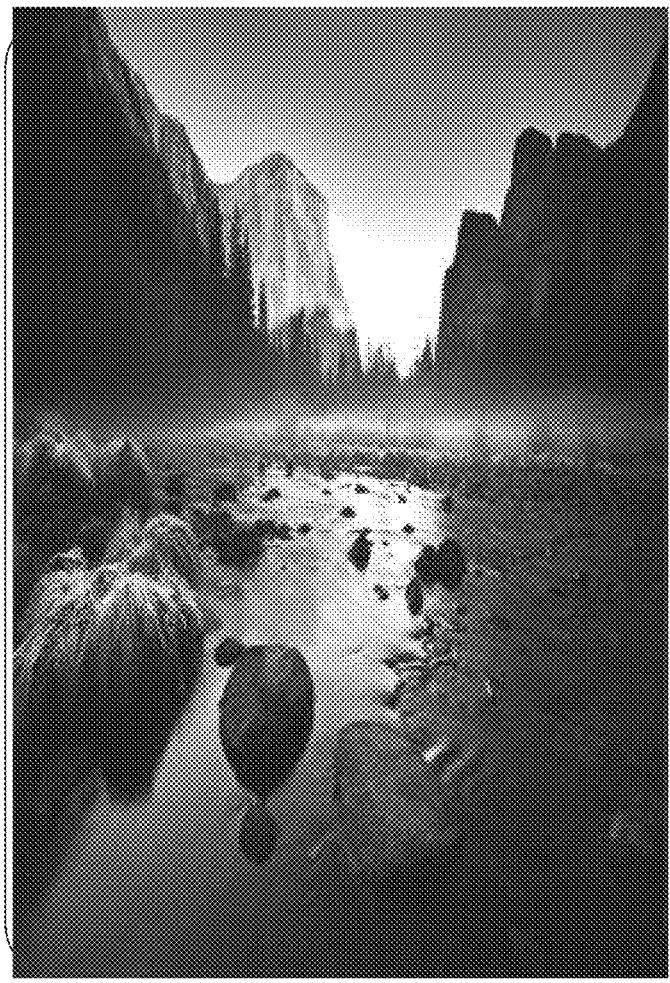

FIG. 6A to FIG. 6C is a schematic diagram of screen display in the message display method according to an embodiment of this application. Refer to FIG. 6A to FIG. 6C. Initially, the user browses images in full screen. After the terminal device receives an important system message, the screen is automatically divided into two regions, which are respectively used to display the interface of the first APP and the important system message. The system message is used to indicate storage space currently occupied by the terminal device. For example, storage space of the terminal device is 128 GB, and 37.08 GB is used currently, where 2.71 GB is used for images, 1.37 GB is used for videos, 25367 GB is used for audio, and so on. A storage cleaner button is further displayed in the region. If the user taps the storage cleaner button, the terminal device automatically restores to the full-screen display mode. Alternatively, a button is further displayed on the screen, as shown by a regular pentagon in the figure. After identifying a second operation instruction of sliding, double-taping, or touching and holding the regular pentagonal button by the user, the terminal device automatically restores to the full-screen display mode. Alternatively, the regular pentagonal button may not be displayed on the screen, and the terminal device automatically restores to the full-screen display mode after detecting that split-screen display duration exceeds a specific threshold.

In the foregoing split-screen display manner, the user may view and reply to the message while using the first APP. The message does not block the interface of the first APP, and the user does not need to exit the first APP and enter another APP, that is, the user does not need to switch between different APPs.

207: Display the system message in a pop-up window.

In this step, if the display manner is the pop-up window display manner, the terminal device displays the system message in the pop-up window display manner. The system message is automatically hidden after being displayed for preset duration, for example, 3 seconds (s). For example, refer to FIG. 7.

Figure 7:
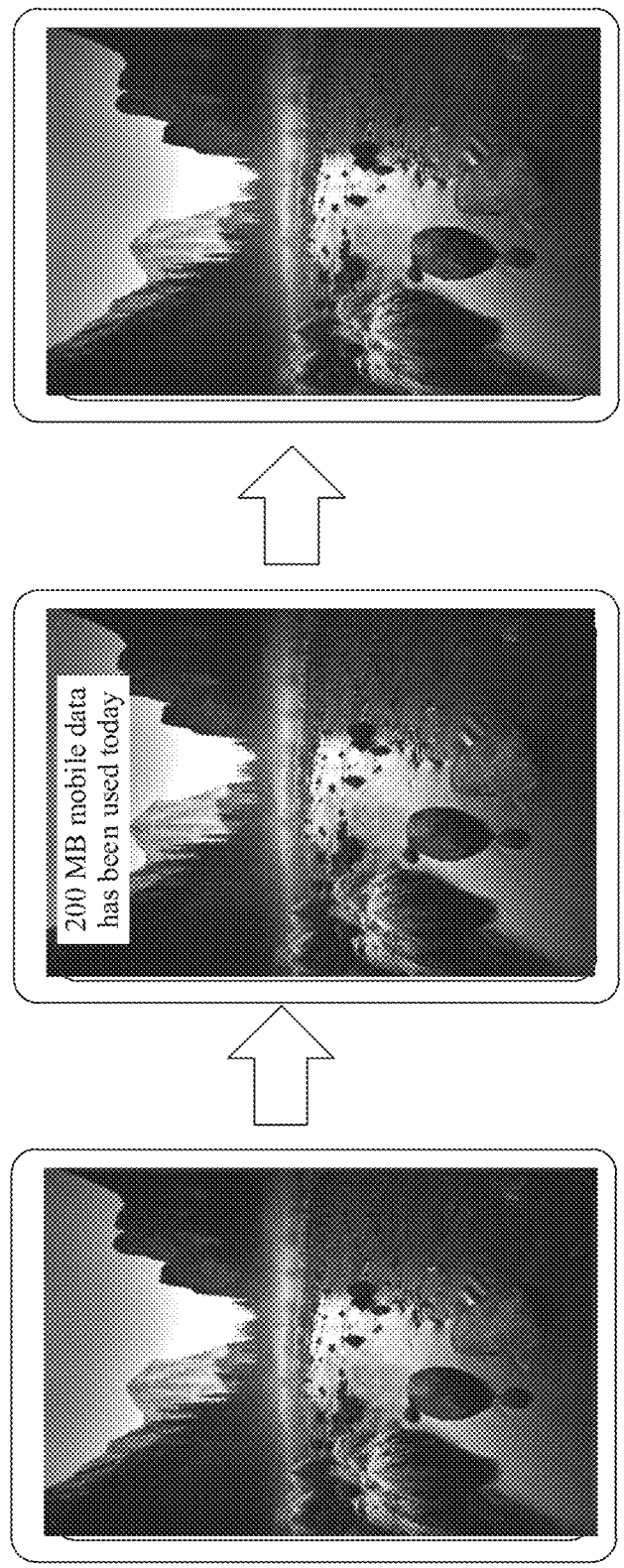
FIG. 7 is a schematic diagram of screen display in a message display method according to an embodiment of this application.
Figure 8B:
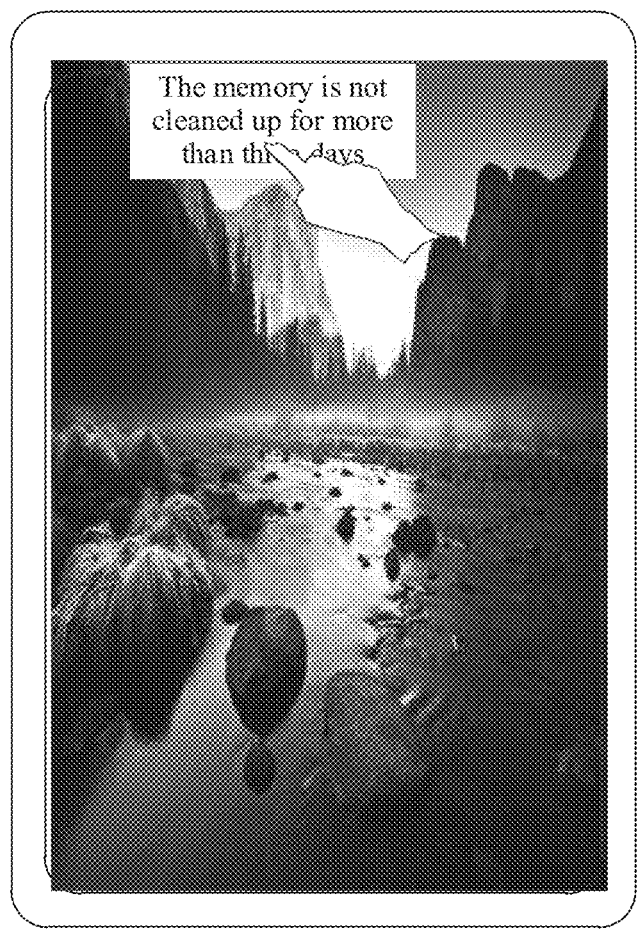
Figure 8C:
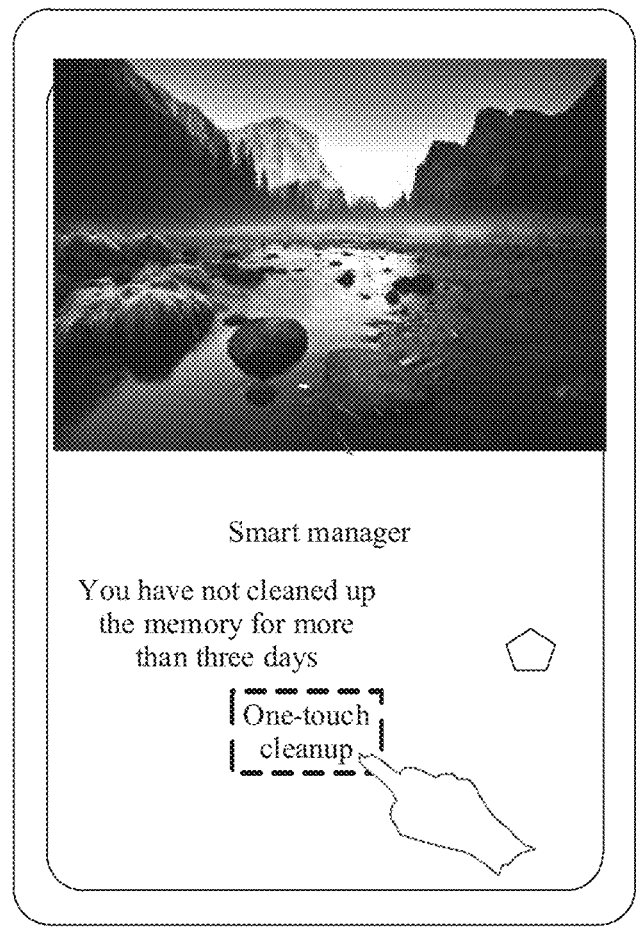
Figure 8D:
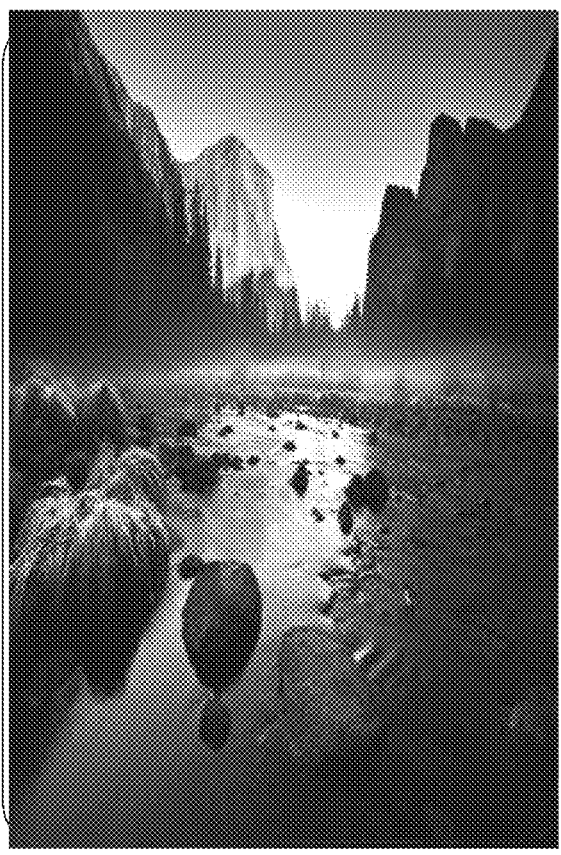
Figure 9A:
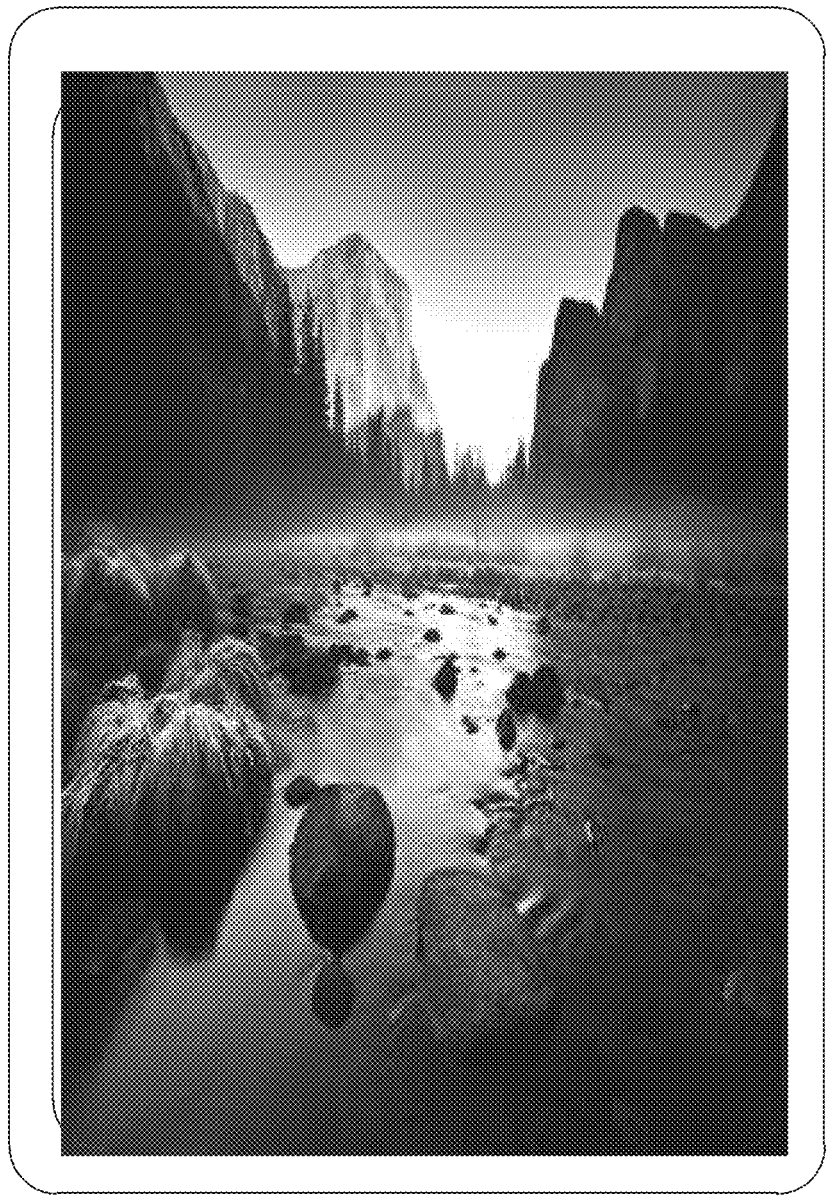
FIG. 9A to FIG. 9D is a schematic diagram of screen display in a message display method according to an embodiment of this application.
Figure 9B:
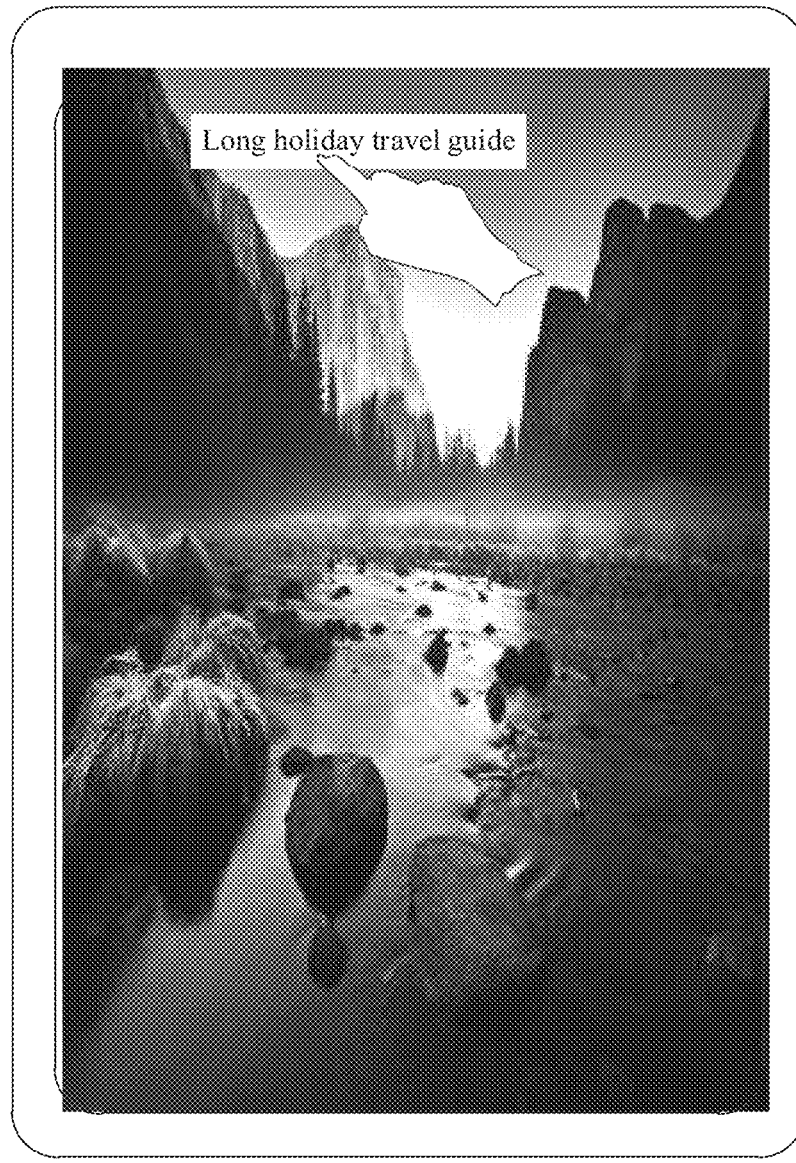
Figure 9C:
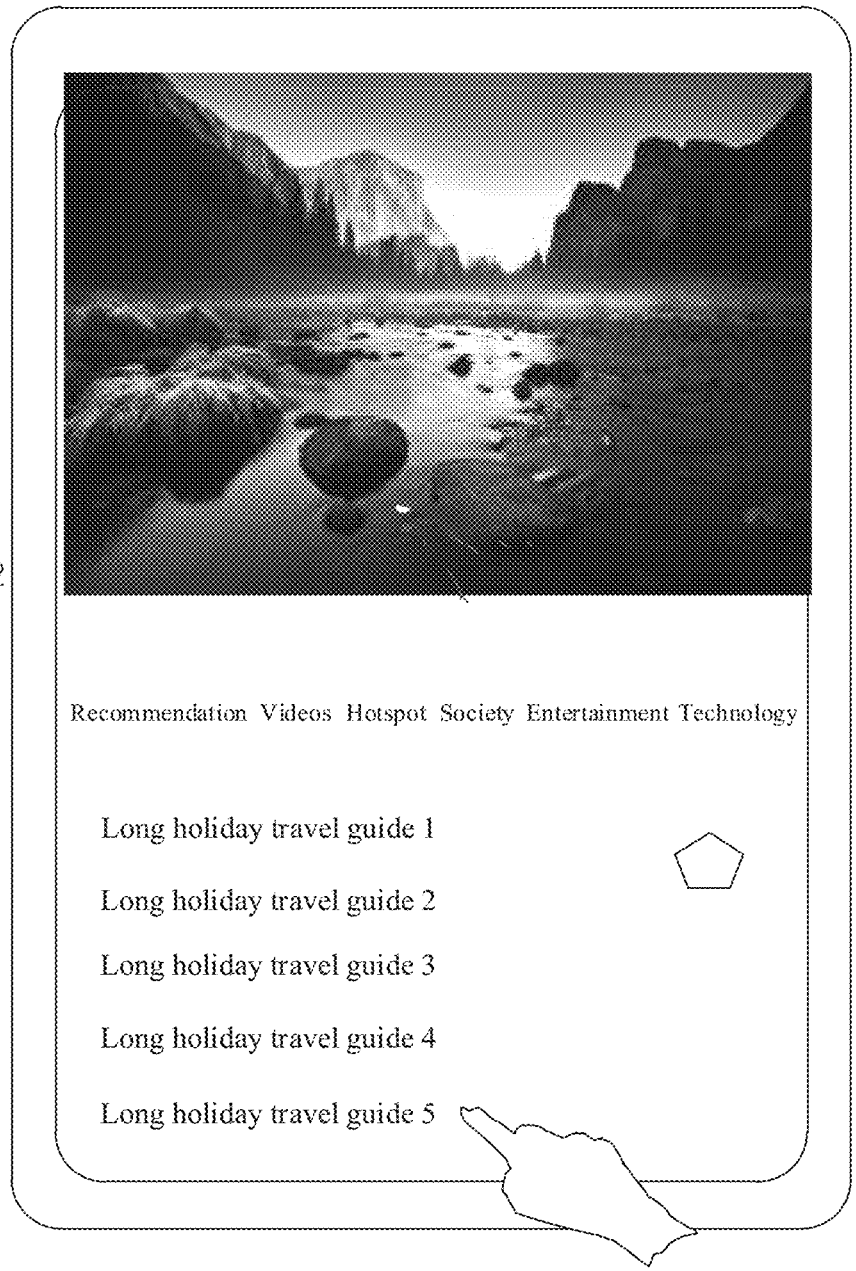
Figure 9D:
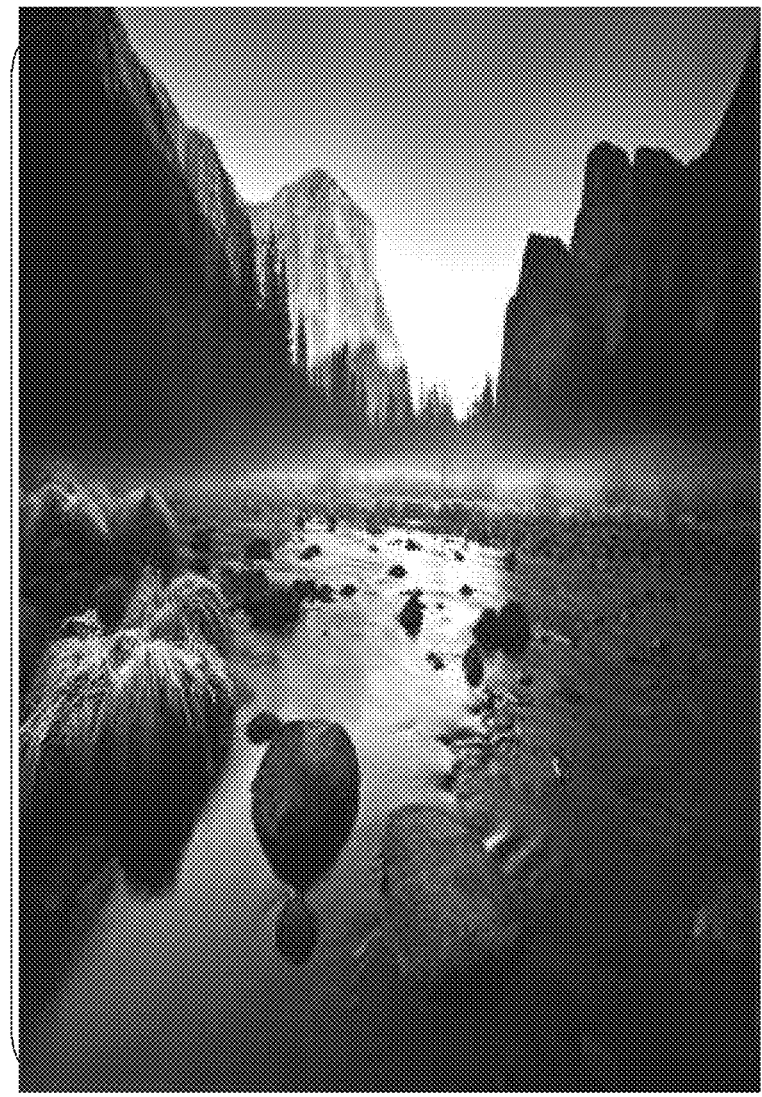

FIG. 7 is a schematic diagram of screen display in the message display method according to an embodiment of this application. Refer to FIG. 7. Initially, the user browses images in full screen. After receiving a simple system message, the terminal device pops up a pop-up window on the screen, where brief content of the system message is displayed in the pop-up window. For example, the system message is used to notify the user that 200 M traffic has been consumed today. After the pop-up window is displayed for preset duration, for example, 3 s, the pop-up window is automatically hidden, and the terminal device returns to the full-screen display mode.

208: When a first operation instruction entered by the user is received, display the first APP and the message in split screens.

The first operation instruction includes any one operation of sliding, double-tapping, or touching and holding the pop-up window. For example, refer to FIG. 8A to FIG. 8D and FIG. 9A to FIG. 9D.

FIG. 8A to FIG. 8D is a schematic diagram of screen display in the message display method according to an embodiment of this application. Refer to FIG. 8A to FIG. 8D. Initially, the user browses images in full screen. When a message received by the terminal device is neither a simple system notification nor an important system notification, a pop-up window is popped-up to display the message. For example, the message is used to prompt the user that the memory has not been cleaned up for three days. When the user taps the pop-up window, the terminal device automatically performs split-screen display. In addition, a button is further displayed on the screen, as shown by a regular pentagon in the figure. After the user processes the message, for example, after tapping a "one-touch cleanup" button, the user enters a second operation instruction, where the second operation instruction is sliding, double-taping, or touching and holding the regular pentagonal button. After identifying the second operation instruction, the terminal device automatically restores to the full-screen display mode. Alternatively, the button may not be displayed on the screen, and the terminal device automatically restores to the full-screen display mode after detecting that the user processes the message. Alternatively, the button may not be displayed on the screen, and the terminal device automatically restores to the full-screen display mode after detecting that split-screen display duration exceeds a specific threshold.

FIG. 9A to FIG. 9D is a schematic diagram of screen display in the message display method according to an embodiment of this application. Refer to FIG. 9A to FIG. 9D. Initially, the user browses images in full screen. After the terminal device receives a reading message, for example, the message is a piece of news related to a travel guide, the terminal device pops up a pop-up window to display the message. When the user taps the pop-up window, the terminal device automatically performs split-screen display. In addition, a button is further displayed on the screen, as shown by a regular pentagon in the figure. After the user processes the message, for example, after the user enters a travel guide (1), the user enters a second operation instruction, where the second operation instruction is sliding, double-taping, or touching and holding the regular pentagonal button. After identifying the second operation instruction, the terminal device automatically restores to the full-screen display mode. Alternatively, the button may not be displayed on the screen, and the terminal device automatically restores to the full-screen display mode after detecting that the user processes the message. Alternatively, the button may not be displayed on the screen, and the terminal device automatically restores to the full-screen display mode after detecting that split-screen display duration exceeds a specific threshold.

209: Determine whether the message includes an edit text, where if the message includes the edit text, step 205 is performed, or if the message does not include the edit text, step 210 is performed.

210: Determine whether the message includes a display type field, where if the message includes the display type field, step 211 is performed, or if the message does not include the display type field, step 212 is performed.

211: Determine the display manner based on the display type field, where if the display manner is the split-screen display, step 205 is performed, or if the display manner is the pop-up window display, step 207 is performed.

For example, after receiving the message of the second APP such as the system APP or the third-party APP, the terminal device constructs a notification class and a notification channel class, and adds the display type field to the notification channel class. A display type indicated by the display type field includes a split-screen display type (FULL_SCREEN_SPLIT), a hidden type (FULL_SCREEN_HIDE), and a pop-up window display type (FULL_SCREEN_SHOW). Then, the second APP initiates notification invoking, and invokes a notification manager class, to further invoke a notification manager service class. A core module obtains the display type from the notification channel class, and queries a mapping relationship table based on the display type to determine the display manner of the message.

212: Determine whether the display manner of the message can be determined based on a category label of the third-party APP, where if the display manner can be determined based on the category label of the third-party APP, step 213 is performed, or if the display manner of the message cannot be determined by updating the category label of the third-party APP, step 214 is performed.

213: Query a mapping relationship table between a category label and a display manner in a local database to determine the display manner of the message.

For example, if the display manner is the split-screen display, step 205 is performed, or if the display manner is the pop-up window display, step 207 is performed.

214: Parse the message to obtain a priority carried in the message, and query a mapping relationship table based on the priority to determine the display manner of the message.

215: Display the message according to a native Android processing flow.

Figure 10:
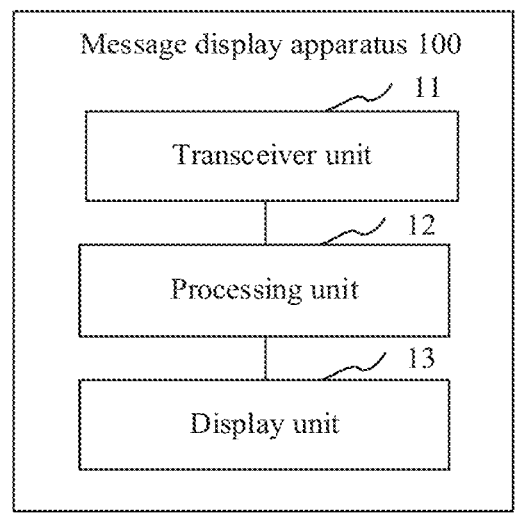
FIG. 10 is a schematic diagram of a structure of a message display apparatus according to an embodiment of this application.

FIG. 10 is a schematic diagram of a structure of a message display apparatus according to an embodiment of this application. The message display apparatus 100 may be implemented in a manner of software and/or hardware. As shown in FIG. 10, the message display apparatus 100 includes:

a transceiver unit 11, configured to: when a terminal device displays an interface of a first application APP, receive a message from a second APP, where the first APP and the second APP are different APPs;

a processing unit 12, configured to select a display manner of the message based on a mapping relationship table between a message of the second APP and a display manner, where the display manner is a split-screen display manner, a pop-up window display manner, or a drop-down notification bar display manner: and a display unit 13, configured to display content of the message based on the display manner.

In a feasible design, the mapping relationship table includes a mapping relationship between an identifier of the second APP and a display manner.

In a feasible design, before selecting the display manner of the message based on the mapping relationship table between a message of the second APP and a display manner, the processing unit 12 is further configured to control the second APP to invoke a notification manager service NMS class at a framework FW layer of the terminal device, and obtain the identifier of the second APP by using the NMS class.

In a feasible design, the mapping relationship table includes a mapping relationship between a category label of the second APP and a display manner, and the category label of the second APP is used to indicate a category to which the second APP belongs.

In a feasible design, before the processing unit 12 selects the display manner of the message based on the mapping relationship table between a message of the second APP and a display manner, the transceiver unit 11 is further configured to receive indication information sent by a server, where the indication information is used to indicate the category label of the second APP: and the processing unit 12 is further configured to determine the mapping relationship table based on the category label of the second APP.

In a feasible design, the mapping relationship table includes a mapping relationship between a priority of the message and a display manner, the priority is added by the terminal device to a notification channel notification channel class corresponding to the message, and the priority is used to indicate importance of the message.

In a feasible design, the priority includes one or more of an emergency priority, a high priority, a default priority, a low priority, or a lowest priority. A display manner corresponding to the emergency priority and the high priority is the split-screen display manner. A display manner corresponding to the default priority is the pop-up window display manner. A display manner corresponding to the low priority and the lowest priority is the drop-down notification display manner.

In a feasible design, the mapping relationship table includes a mapping relationship between a message type of the message and a display manner, and the message type is used to indicate whether the message includes an edit text. If the message includes the edit text, the display manner is the split-screen display manner, or if the message does not include the edit text, the display manner is the pop-up window display manner.

In a feasible design, when the display manner is the pop-up window display, after the display unit 13 displays the content of the message based on the display manner, the transceiver unit 11 is further configured to display the first APP and the message in split screens when receiving a first operation instruction of operating, by a user, a pop-up window displayed in the pop-up window display manner, where the first operation instruction includes any one operation of sliding, double-tapping, or touching and holding the pop-up window.

In a feasible design, when the display manner is the split-screen display manner, the display unit 13 is further configured to: display a button on a screen of the terminal device, and display the interface of the first APP in full screen when the transceiver unit 11 receives a second operation instruction of operating the displayed button by a user, where the second operation instruction includes any one operation of sliding, double-tapping, or touching and holding the button: or the display unit 13 displays the interface of the first APP in full screen after waiting for preset duration.

In a feasible design, the message includes any one of the following messages: a message of a third-party APP, a system message of the terminal device, or a message of an APP of the terminal device.

The message display apparatus provided in this embodiment of this application may perform actions of the terminal device in the foregoing embodiments. An implementation principle and a technical effect of the message display apparatus thereof are similar. Details are not described herein again.

It should be noted that, it should be understood that the transceiver unit may be a transceiver in actual implementation, and the processing unit may be implemented in a form of software invoked by a processing element, or may be implemented in a form of hardware. For example, the processing unit may be a separately disposed processing element, or may be integrated into a chip of the foregoing apparatus for implementation. In addition, the processing unit may alternatively be stored in a memory of the foregoing apparatus in a form of program code, and is invoked by a processing element of the foregoing apparatus to perform a function of the processing unit. In addition, all or some of the units may be integrated, or may be implemented independently. The processing element herein may be an integrated circuit and has a signal processing capability. In an implementation process, steps of the foregoing method or the foregoing units may be implemented by using a hardware integrated logical circuit in the processing element, or by using instructions in a form of software.

For example, the foregoing units may be one or more integrated circuits configured to implement the foregoing method, for example, one or more application-specific integrated circuits (application specific integrated circuit, ASIC), one or more microprocessors (digital signal processor, DSP), or one or more field programmable gate arrays (field programmable gate array, FPGA). For another example, when one of the units is implemented in a form of scheduling program code by a processing element, the processing element may be a general-purpose processor, for example, a central processing unit (Central Processing Unit, CPU) or another processor that can invoke the program code. For another example, the units may be integrated and implemented in a form of a system-on-a-chip (system-on-a-chip, SOC).

Figure 11:
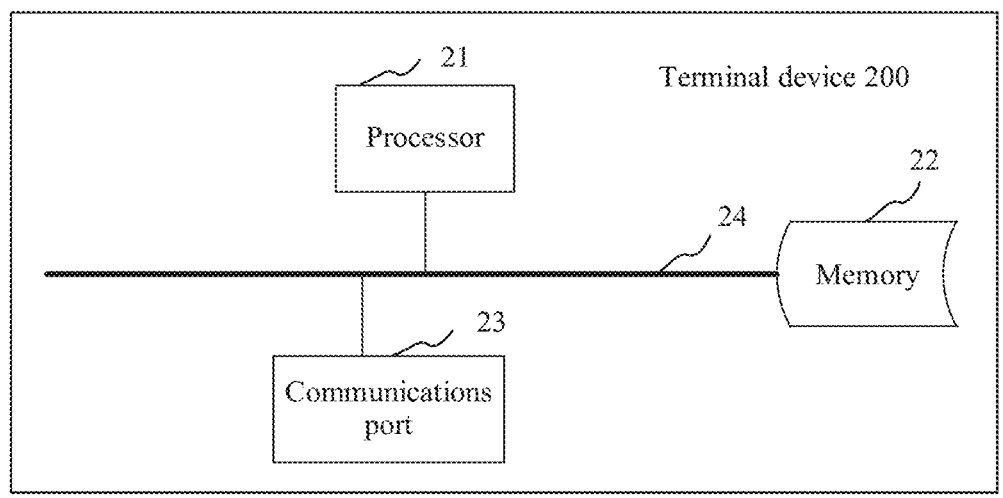
FIG. 11 is a schematic diagram of a structure of a terminal device according to an embodiment of this application.

FIG. 11 is a schematic diagram of a structure of a terminal device according to an embodiment of this application. As shown in FIG. 11, the terminal device 200 includes:

a processor 21 and a memory 22, where the memory 22 stores computer-executable instructions.

The processor 21 executes the computer-executable instructions stored in the memory 22, so that the processor 21 is enabled to perform the following steps:

when the terminal device displays an interface of a first application APP, receiving a message from a second APP, where the first APP and the second APP are different APPs;

selecting a display manner of the message based on a mapping relationship table between a message of the second APP and a display manner, where the display manner is a split-screen display manner, a pop-up window display manner, or a drop-down notification bar display manner; and displaying content of the message based on the display manner.

In a feasible design, the mapping relationship table includes a mapping relationship between an identifier of the second APP and a display manner.

In a feasible design, before the selecting a display manner of the message based on a mapping relationship table between a message of the second APP and a display manner, the following steps are further included: The second APP invokes a notification manager service NMS class at a framework FW layer of the terminal device, and obtains the identifier of the second APP by using the NMS class.

In a feasible design, the mapping relationship table includes a mapping relationship between a category label of the second APP and a display manner, and the category label of the second APP is used to indicate a category to which the second APP belongs.

In a feasible design, before the selecting a display manner of the message based on a mapping relationship table between a message of the second APP and a display manner, the following steps are further included: receiving indication information sent by a server, where the indication information is used to indicate the category label of the second APP, and determining the mapping relationship table based on the category label of the second APP.

In a feasible design, the category label includes one or more of the following: a social category, an information category, an online shopping payment category, a daily consumption category, a query tool category, and a reading category. When the category label of the second APP is the social category, the display manner is the split-screen display manner. When the category label of the second APP is the information category or the online shopping payment category, the display manner is the pop-up window display manner. When the category label of the second APP is the daily consumption category, the query tool category, or the reading category, the display manner is the drop-down notification bar display manner.

In a feasible design, the mapping relationship table includes a mapping relationship between a priority of the message and a display manner, the priority is added by the terminal device to a notification channel notification channel class corresponding to the message, and the priority is used to indicate importance of the message.

In a feasible design, the priority includes one or more of an emergency priority, a high priority, a default priority, a low priority, or a lowest priority. A display manner corresponding to the emergency priority and the high priority is the split-screen display manner. A display manner corresponding to the default priority is the pop-up window display manner. A display manner corresponding to the low priority and the lowest priority is the drop-down notification display manner.

In a feasible design, the mapping relationship table includes a mapping relationship between a message type of the message and a display manner, and the message type is used to indicate whether the message includes an edit text. If the message includes the edit text, the display manner is the split-screen display manner, or if the message does not include the edit text, the display manner is the pop-up window display manner.

In a feasible design, when the display manner is the pop-up window display, after the displaying content of the message based on the display manner, the following step is further included: displaying the first APP and the message in split screens when a first operation instruction of operating, by a user, a pop-up window displayed in the pop-up window display manner is received, where the first operation instruction includes any one operation of sliding, double-tapping, or touching and holding the pop-up window.

In a feasible design, when the display manner is the split-screen display manner, the method further includes: displaying a button on a screen of the terminal device, and displaying the interface of the first APP in full screen when a second operation instruction of operating the displayed button by a user is received, where the second operation instruction includes any one operation of sliding, double-tapping, or touching and holding the button; or displaying the interface of the first APP in full screen after waiting for preset duration.

In a feasible design, the message includes any one of the following messages: a message of a third-party APP, a system message of the terminal device, or a message of an APP of the terminal device.

Optionally, still refer to FIG. 11. The terminal device 200 further includes a communications interface 23. The processor 21, the memory 22, and the communications interface 23 may be connected through a bus 24.

An embodiment of this application further provides a storage medium. The storage medium stores computer-executable instructions. When being executed by a processor, the computer-executable instructions are used to implement the message display method performed by the terminal device.

An embodiment of this application further provides a computer program product. When the computer program product runs on a terminal device, the computer program product is used to implement the message display method performed by the terminal device.

Figure 12:
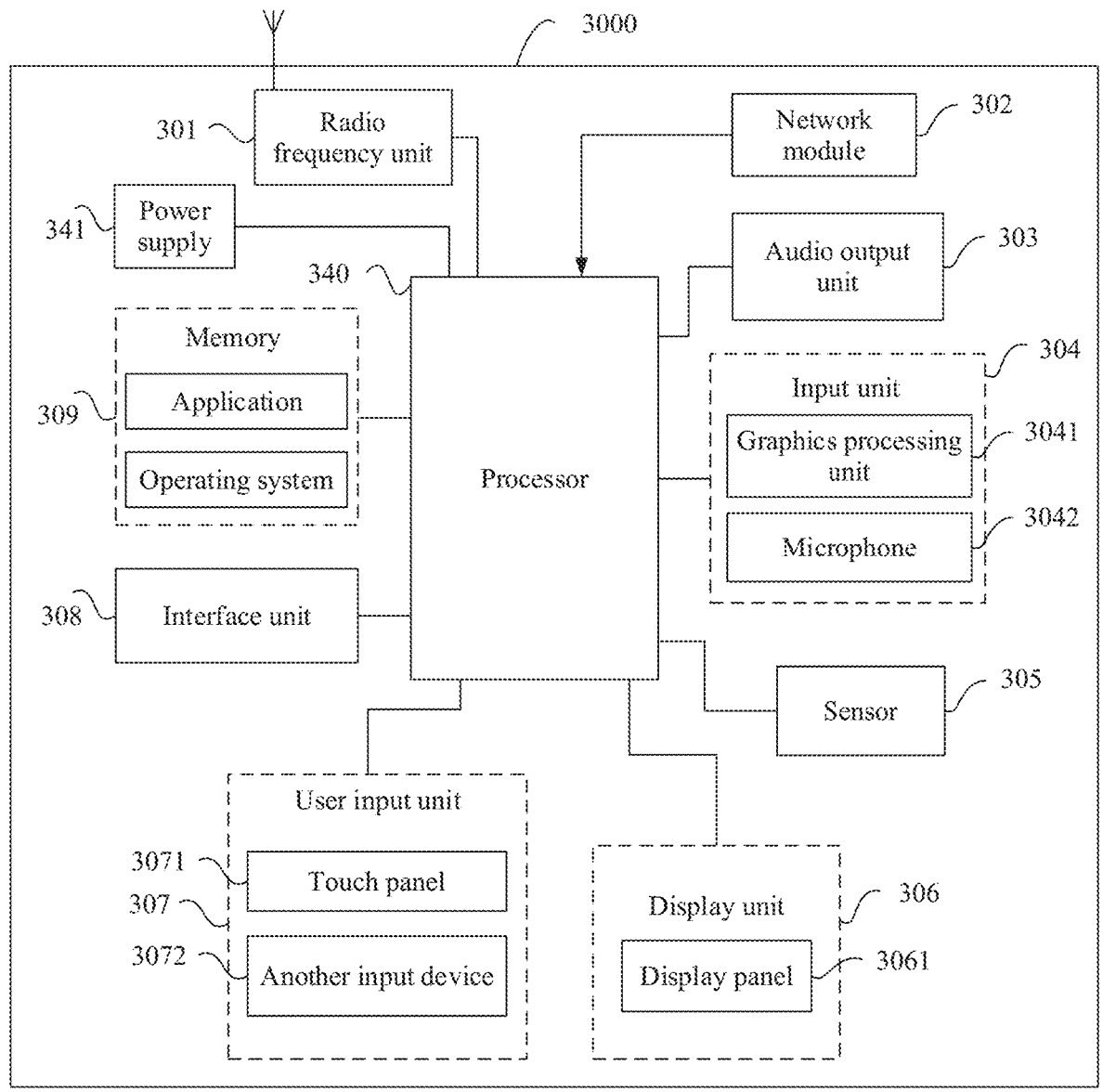
FIG. 12 is a schematic diagram of a hardware structure of a terminal device according to an embodiment of this application.

FIG. 12 is a schematic diagram of a hardware structure of a terminal device according to an embodiment of this application. As shown in FIG. 12, a terminal device 3000 includes but is not limited to components such as a radio frequency unit 301, a network module 302, an audio output unit 303, an input unit 304, a sensor 305, a display unit 306, a user input unit 307, an interface unit 308, a memory 309, a processor 340, and a power supply 341. A person skilled in the art may understand that the structure of the terminal device shown in FIG. 12 constitutes no limitation on the terminal device, and the terminal device 3000 may include more or fewer components than those shown in the figure, or have some components combined, or have different component arrangements. In this embodiment of this application, the terminal device includes but is not limited to a mobile phone, a tablet computer, a palmtop computer, or the like.

The user input unit 307 is configured to receive a user input. The display unit 306 is configured to display content based on the input in response to the input received by the user input unit 307.

It should be understood that in this embodiment of this application, the radio frequency unit 301 may be configured to receive and send signals in an information receiving and sending process or in a call process. The radio frequency unit 301 usually includes but is not limited to an antenna, at least one amplifier, a transceiver, a coupler, a low noise amplifier, a duplexer, or the like. In addition, the radio frequency unit 301 may communicate with a network and another device by using a wireless communications system.

The terminal device 3000 provides wireless broadband internet access for a user by using the network module 302, for example, helps the user send and receive emails, browse a web page, and access streaming media.

The audio output unit 303 may convert audio data received by the radio frequency unit 301 or the network module 302 or stored in the memory 309 into an audio signal, and output the audio signal as a sound. In addition, the audio output unit 303 may provide an audio output (such as a call signal receiving sound or a message receiving sound) related to a particular function executed by the terminal device 3000. The audio output unit 303 includes a speaker, a buzzer, a receiver, and the like.

The input unit 304 is configured to receive an audio or video signal. The input unit 304 may include a graphics processing unit (Graphics Processing Unit, GPU) 3043 and a microphone 3042. The graphics processing unit 3043 is configured to process image data of an image or a video captured by a camera or the like. A processed image frame may be displayed on the display unit 306. The image frame processed by the graphics processing unit 3043 may be stored in the memory 309 (or another storage medium) or sent by using the radio frequency unit 301 or the network module 302. The microphone 3042 may receive a sound and can process such sound into audio data. The processed audio data may be converted, in a call mode, into a format that can be sent to a mobile communications base station by using the radio frequency unit 301 for output.

The terminal device 3000 further includes at least one sensor 305, such as an optical sensor, a motion sensor, and other sensors. Specifically, the optical sensor includes an ambient light sensor and a proximity sensor. The ambient light sensor may adjust luminance of a display panel 3063 based on brightness of ambient light. The proximity sensor may turn off the display panel 3063 and/or backlight when the terminal device 3000 approaches an ear. As a type of motion sensor, an accelerometer sensor may detect a value of an acceleration in each direction (usually, three axes), may detect a value and a direction of gravity in a static state, and may be used for identifying a posture of the terminal device (such as screen switching between a landscape mode and a portrait mode, a related game, or magnetometer posture calibration), a function related to vibration identification (such as a pedometer or a knock), and the like. The sensor 305 may further include a fingerprint sensor, a pressure sensor, an iris sensor, a molecular sensor, a gyroscope, a barometer, a hygrometer, a thermometer, an infrared sensor, and the like. Details are not described herein.

The display unit 306 is configured to display information entered by the user or information provided for the user. The display unit 306 may include the display panel 3063. Optionally, the display panel 3063 may be configured in a form of a liquid crystal display (Liquid Crystal Display, LCD), an organic light-emitting diode (Organic Light-Emitting Diode, OLED), or the like.

The user input unit 307 may be configured to: receive entered digital information or character information, and generate a key signal input related to user settings and function control of the terminal device. Specifically, the user input unit 307 includes a touch panel 3073 and another input device 3072. The touch panel 3073 is also referred to as a touchscreen, and may collect a touch operation performed by the user on or near the touch panel (for example, an operation performed by the user on the touch panel 3073 or near the touch panel 3073 by using any proper object or accessory such as a finger or a stylus). The touch panel 3073 may include two parts: a touch detection apparatus and a touch controller. The touch detection apparatus detects a touch orientation of the user, detects a signal brought by a touch operation, and transfers the signal to the touch controller. The touch controller receives touch information from the touch detection apparatus, converts the touch information into coordinates of a touch point, sends the coordinates to the processor 340, and receives and executes a command sent by the processor 340. In addition, the touch panel 3073 may be implemented in a plurality of types such as a resistive type, a capacitive type, an infrared type, and a surface acoustic wave type. The user input unit 307 may include the another input device 3072 in addition to the touch panel 3073. Specifically, the another input device 3072 may include but is not limited to a physical keyboard, a function button (such as a volume control button or an on/off button), a trackball, a mouse, a joystick, and the like. Details are not described herein.

Further, the touch panel 3073 may cover the display panel 3063. When detecting a touch operation on or near the touch panel 3073, the touch panel 3073 transfers the touch operation to the processor 340 to determine a type of a touch event. The processor 340 then provides a corresponding visual output on the display panel 3063 based on the type of the touch event. The touch panel 3073 and the display panel 3063 in FIG. 12 are used as two independent components to implement input and output functions of the terminal device. However, in some embodiments, the touch panel 3073 and the display panel 3063 may be integrated to implement the input and output functions of the terminal device. This is not specifically limited herein.

The interface unit 308 is an interface for connecting an external apparatus and the terminal device 3000. For example, the external apparatus may include a wired or wireless headphone port, an external power supply (or battery charger) port, a wired or wireless data port, a memory card port, a port used to connect to an apparatus having an identification module, an audio input/output (I/O) port, a video I/O port, or a headset port. The interface unit 308 may be configured to receive an input (for example, data information and power) from the external apparatus, and transmit the received input to one or more elements in the terminal device 3000, or may be configured to transmit data between the terminal device 3000 and the external apparatus.

The memory 309 may be configured to store a software program and various types of data. The memory 309 may mainly include a program storage area and a data storage area. The program storage area may store an operating system, an application required by at least one function (such as a sound playing function or an image playing function), and the like. The data storage area may store data (such as audio data or an address book) created based on use of a mobile phone, and the like. In addition, the memory 309 may include a high-speed random access memory, and may further include a nonvolatile memory such as at least one magnetic disk storage device and a flash storage device, or another volatile solid-state storage device.

The processor 340 is a control center of the terminal device, is connected to all parts of the entire terminal device by using various interfaces and lines, and performs various functions of the terminal device and data processing by running or executing the software program and/or a module that are/is stored in the memory 309 and by invoking the data stored in the memory 309, to perform overall monitoring on the terminal device. The processor 340 may include one or more processing units. Optionally, an application processor and a modem processor may be integrated into the processor 340. The application processor mainly processes an operating system, a user interface, an application, and the like. The modem processor mainly processes wireless communication. It may be understood that the modem processor may alternatively not be integrated into the processor 340.

Refer to FIG. 12. In this embodiment of this application, the memory 309 stores a computer program, and the processor 340 runs the computer program, so that the terminal device performs the foregoing message display method.

In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, any conventional processor, or the like. The steps of the methods disclosed with reference to embodiments of this application may be directly performed by a hardware processor, or may be performed by a combination of hardware and software modules in the processor.

In this embodiment of this application, the memory may be a nonvolatile memory, for example, a hard disk drive (hard disk drive, HDD) or a solid-state drive (solid-state drive, SSD), or may be a volatile memory (volatile memory), for example, a random access memory (random-access memory, RAM). The memory is any other medium that can be used to carry or store expected program code in a form of an instruction or a data structure and that can be accessed by a computer. However, this is not limited thereto. The memory in this embodiment of this application may alternatively be a circuit or any other apparatus that can implement a storage function, and is configured to store the program instructions and/or the data.

All or some of the foregoing methods in embodiments of this application may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium (for example, an SSD), or the like.

It is clear that a person skilled in the art can make various modifications and variations to this application without departing from the scope of this application. This application is intended to cover these modifications and variations of this application provided that they fall within the scope of protection defined by the following claims and their equivalent technologies of this application.

What is claimed is:

1. A method comprising:
receiving a message from a second application (APP) when displaying an interface of a first APP;
making a selection of a display manner of the message by querying a pre-stored mapping relationship table between the message and the display manner, wherein the pre-stored mapping relationship table and comprises a relationship between the display manner and one of a message type of the second application, a priority of the message, category label of the second APP, or an identifier of the second APP, and wherein the display manner comprises a split-screen display manner, a pop-up window display manner, or a drop-down notification bar display manner;
displaying, based on the selection after querying the pre-stored mapping relationship table between the message and the display manner, the message in the pop-up window display manner on the interface of the first APP when the message type indicates that the message does not comprise an edit text;
accepting, during displaying the message, a first operation comprising sliding, double-tapping, or touching and holding a pop-up window of the message; and
displaying, in response to the first operation, content of the message in the split-screen display manner.

2. The method of claim 1, wherein the interface is a full-screen display mode.

3. The method of claim 1, wherein after displaying the message, the method further comprises hiding the pop-up window when a displaying duration of the pop-up window exceeds a preset duration.

4. The method of claim 1, wherein before displaying the content, the method further comprises checking whether the second APP supports the split-screen display manner.

5. The method of claim 1, further comprising:
accepting a second operation; and
setting, in response to the second operation, a size of the first APP and the second APP.

6. The method of claim 1, further comprising:
accepting a third operation; and
setting, in response to the third operation, a location of the first APP and the second APP.

7. The method of claim 6, wherein the location is an up-down location or a left-right location.

8. The method of claim 1, wherein the pop-up window comprises an icon of the second APP or brief content of the message.

9. The method of claim 1, wherein in the split-screen display manner, a second content of the first APP is not interrupted.

10. A terminal device comprising:
a memory configured to store instructions; and
one or more processors coupled to the memory and configured to:
receive a message from a second application (APP) when displaying an interface of a first APP;
make a selection of a display manner of the message based on a pre-stored mapping relationship table between the message and the display manner, wherein the pre-stored mapping relationship table comprises a relationship between the display manner and one of a message type of the second application, a priority of the message, category label of the second APP, or an identifier of the second APP, and wherein the display manner comprises a split-screen display manner, a pop-up window display manner, or a drop-down notification bar display manner;

display, based on the selection after querying the pre-stored mapping relationship table between the message and the display manner, the message in the pop-up window display manner on the interface of the first APP when the message type indicates that the message does not comprise an edit text;

accept, during displaying the message, a first operation comprising sliding, double-tapping, or touching and holding a pop-up window; and display, in response to the first operation, content of the message in the split-screen display manner.

11. The terminal device of claim 10, wherein the interface is a full-screen display mode.

12. The terminal device of claim 10, wherein the one or more processors are further configured to hide the pop-up window when a displaying duration of the pop-up window exceeds a preset duration.

13. The terminal device of claim 10, wherein the one or more processors are further configured to check whether the second APP supports the split-screen display manner before displaying the content.

14. The terminal device of claim 10, wherein the one or more processors are further configured to:
accept a second operation; and
set, in response to the second operation, a size of the first APP and the second APP.

15. The terminal device of claim 10, wherein the one or more processors are further configured to:
accept a third operation; and
set, in response to the third operation, a location of the first APP and the second APP.

16. The terminal device of claim 15, wherein the location is an up-down location or a left-right location.

17. The terminal device of claim 10, wherein the pop-up window comprises an icon of the second APP or brief content of the message.

18. The terminal device of claim 10, wherein in the split-screen display manner, a second content of the first APP is not interrupted.

19. A computer program product comprising computer-executable instructions stored on a non-transitory computer readable storage medium that, when executed by a processor, cause a terminal device to:

receive a message from a second application (APP) when displaying an interface of a first APP;

make a selection of a display manner of the message based on a pre-stored mapping relationship table between the message and the display manner, wherein the pre-stored mapping relationship table comprises a relationship between the display manner and one of a message type of the second application, a priority of the message, category label of the second APP, or an identifier of the second APP, and wherein the display manner comprises a split-screen display manner, a pop-up window display manner, or a drop-down notification bar display manner;

display, based on the selection after querying the pre-stored mapping relationship table between the message and the display manner, the message in the pop-up window display manner on the interface of the first APP when the message type indicates that the message does not comprise an edit text;

accept, during displaying the message, a first operation comprising sliding, double-tapping, or touching and holding a pop-up window of the message; and display, in response to the first operation, content of the message in the split-screen display manner.

20. The computer program product of claim 19, wherein the interface is a full-screen display mode.

* * * * *